(12) United States Patent
Weston et al.

(10) Patent No.: US 12,233,853 B2
(45) Date of Patent: Feb. 25, 2025

(54) METHODS AND APPARATUS TO MONITOR AND PREVENT TRAILER SWAY OF A VEHICLE AND TRAILER

(71) Applicant: Ford Global Technologies, LLC, Dearborn, MI (US)

(72) Inventors: Keith Weston, Canton, MI (US); Andrew Denis Lewandowski, Sterling Heights, MI (US); Matthew Johnson, Toledo, OH (US); Brendan Diamond, Grosse Pointe, MI (US); Jordan Barrett, Milford, MI (US); Andrew Niedert, New Hudson, MI (US); Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 17/970,277

(22) Filed: Oct. 20, 2022

(65) Prior Publication Data

US 2024/0132054 A1 Apr. 25, 2024
US 2024/0227782 A9 Jul. 11, 2024

(51) Int. Cl.
*B60W 30/045* (2012.01)
*B60W 40/13* (2012.01)
*B60W 50/00* (2006.01)

(52) U.S. Cl.
CPC .......... *B60W 30/045* (2013.01); *B60W 40/13* (2013.01); *B60W 50/0097* (2013.01); *B60W 2040/1307* (2013.01); *B60W 2300/14* (2013.01); *B60W 2520/10* (2013.01); *B60W 2552/30* (2020.02); *B60W 2556/10* (2020.02); *B60W 2720/106* (2013.01); *B60W 2720/30* (2013.01)

(58) Field of Classification Search
CPC ......... B60W 2300/14; B60W 2520/10; B60W 2552/30; B60W 2556/10; B60W 2720/30; B60W 2720/106; B60W 30/045; B60W 40/13; B60W 2040/1307; B60W 50/0097
See application file for complete search history.

(56) References Cited

U.S. PATENT DOCUMENTS

| | | |
|---|---|---|
| 9,676,377 B2 | 6/2017 | Hafner et al. |
| 9,849,910 B2 | 12/2017 | Hoel et al. |
| 9,981,662 B2 | 5/2018 | Lavoie et al. |
| 11,440,585 B2 | 9/2022 | Lavoie et al. |

(Continued)

FOREIGN PATENT DOCUMENTS

GB 2518857 4/2015

*Primary Examiner* — Lori Wu
(74) *Attorney, Agent, or Firm* — Hanley, Flight & Zimmerman, LLC; Lorne Forsythe

(57) ABSTRACT

Methods and apparatus to prevent trailer sway are disclosed. An example apparatus to prevent trailer sway of a trailer coupled to a vehicle includes prediction circuitry to predict, based on sensor data from one or more sensors of the vehicle, whether a trailer sway condition associated with the vehicle is likely to occur, and control activation circuitry to, in response to the prediction that the trailer sway is likely to occur, activate at least one vehicle control of the vehicle to prevent the trailer sway condition from occurring, the at least one vehicle control to include applying torque to at least one of one or more trailer wheels of the trailer or one or more vehicle wheels of the vehicle.

20 Claims, 12 Drawing Sheets

(56) References Cited

U.S. PATENT DOCUMENTS

| | | | |
|---|---|---|---|
| 2008/0172163 A1* | 7/2008 | Englert | B60T 8/1708 |
| | | | 303/147 |
| 2016/0101810 A1* | 4/2016 | Xu | G01B 21/22 |
| | | | 701/41 |
| 2018/0127024 A1* | 5/2018 | Pourrezaei Khaligh | |
| | | | B60D 1/246 |
| 2019/0001944 A1* | 1/2019 | Ying | B60T 8/17551 |
| 2022/0203999 A1* | 6/2022 | Lin | B60D 1/62 |
| 2023/0064300 A1* | 3/2023 | McGrory | B60W 30/02 |

* cited by examiner

| VEHICLE WEIGHT | TRAILER WEIGHT | CG ESTIMATE | TONGUE LOAD | TRAILER SWAY LIKELIHOOD SCORE |
|---|---|---|---|---|
| 6000 | 10000 | LOW | 20% | 4 |
| 6000 | 2000 | LOW | 15% | 2 |
| 8000 | 12000 | HIGH | 8% | 7 |
| 6000 | 0 | LOW | NA | 1 |
| 6000 | 10000 | LOW | 5% | 10 |

METHODS AND APPARATUS TO MONITOR AND PREVENT TRAILER SWAY OF A VEHICLE AND TRAILER

FIELD OF THE DISCLOSURE

This disclosure relates generally to vehicles and, more particularly, to methods and apparatus to monitor and prevent trailer sway of a vehicle and trailer.

BACKGROUND

A trailer hitch can be used to couple a trailer to a vehicle to increase a towing capacity thereof. In some cases, a weight of the trailer on the vehicle alters a load distribution on wheels of the vehicle. In some cases, steering and/or maneuvering capabilities of the vehicle may vary based on the load distribution. Accordingly, a combination of the vehicle and the trailer can have different steering and/or maneuvering capabilities compared to the vehicle alone.

SUMMARY

An example apparatus disclosed herein includes prediction circuitry to predict, based on sensor data from one or more sensors of the vehicle, whether a trailer sway condition associated with the vehicle is likely to occur, and trailer sway avoidance circuitry to, in response to a prediction that the trailer sway condition is likely to occur, activate at least one vehicle control of the vehicle to prevent the trailer sway condition from occurring, the at least one vehicle control to include applying torque to a wheel of a trailer coupled to the vehicle.

A method disclosed herein includes predicting, based on sensor data from one or more sensors of the vehicle, whether a trailer sway condition associated with the vehicle is likely to occur, and in response to a prediction that the trailer sway condition is likely to occur, activating at least one vehicle control of the vehicle to prevent the trailer sway condition from occurring, the at least one vehicle control to include applying torque to wheel of a trailer coupled to the vehicle.

An example apparatus comprises memory including stored instructions, and a processor to execute the instructions to predict, based on sensor data from one or more sensors of the vehicle, whether a trailer sway condition associated with the vehicle is likely to occur, and in response to a prediction that the trailer sway condition is likely to occur, activate at least one vehicle control of the vehicle to prevent the trailer sway condition from occurring, the vehicle control of the vehicle to include applying torque to a wheel of a trailer coupled to the vehicle.

BRIEF DESCRIPTION OF THE DRAWINGS

FIG. 6 is a table representative of trailer sway likelihood determination.

Figure 1:
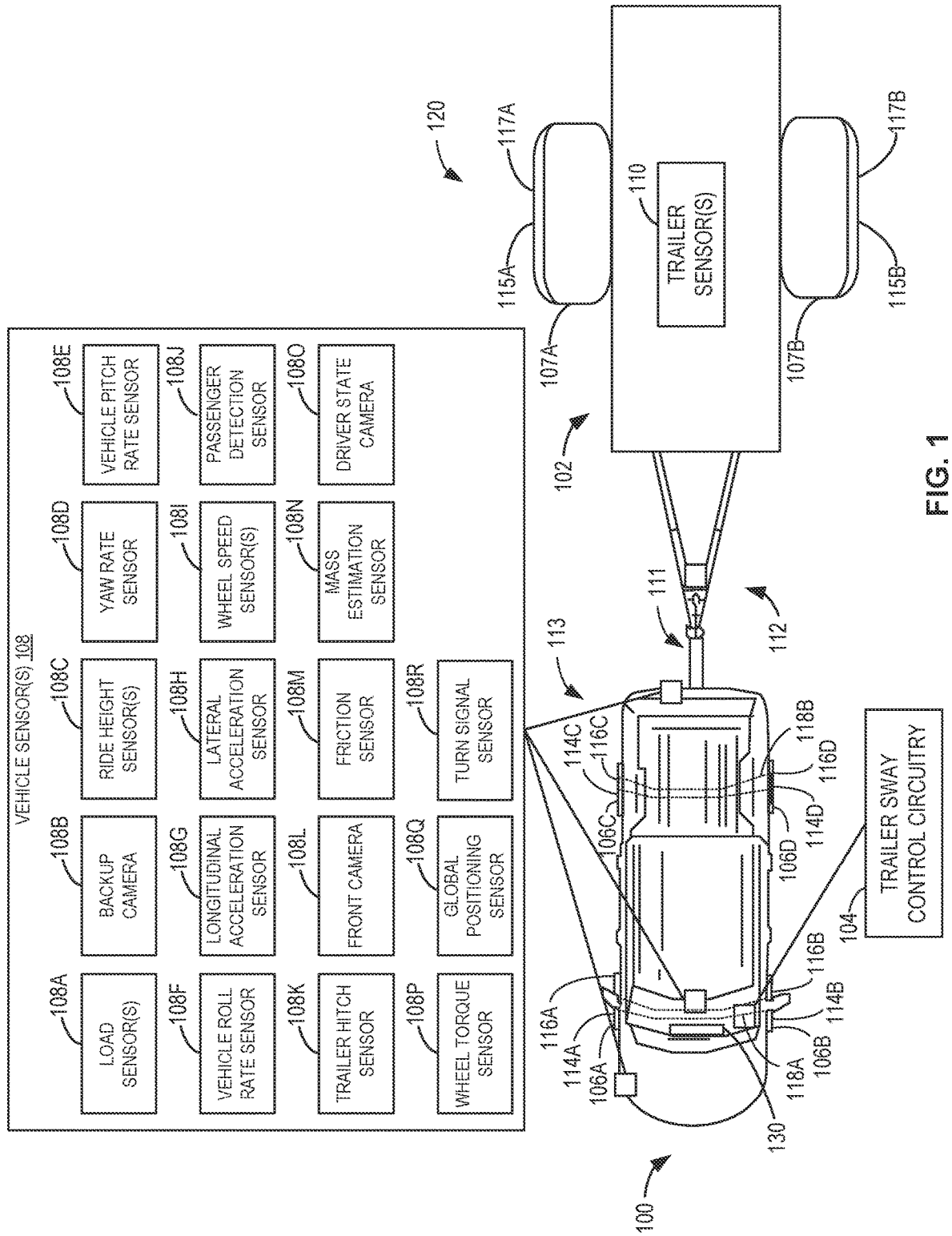
FIG. 1 illustrates an example vehicle and an example trailer coupled thereto, where the vehicle implements example trailer sway circuitry in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A trailer can be coupled to a vehicle to increase a towing capacity of the vehicle. In some cases, a load secured to the trailer may shift, resulting in trailer sway during vehicle travel. In some cases, an upcoming road change (e.g., a curve, an incline, a speed limit change) may result in trailer sway. Such trailer sway may alter maneuverability and/or steering capabilities of the vehicle. For instance, the trailer sway may result in vehicle oversteer and/or understeer. As disclosed herein, "understeer" refers to a tendency of the vehicle to turn less than an amount commanded by an operator of the vehicle, resulting in a larger turn radius of the vehicle. Conversely, "oversteer" refers to a tendency of the vehicle to turn more than the amount commanded by the operator, resulting in a smaller turn radius of the vehicle. In some instances, the trailer sway may result in slippage of the wheels of the vehicle. In some instances, trailer sway may result in a significant shift in a load distribution of the vehicle.

Currently, some vehicles react to trailer sway after the trailer sway has occurred. Some vehicles include emergency vehicle control systems such as an anti-lock brake system (ABS), a traction control system (TCS), and/or electronic stability control (ESC) that utilizes a physical actuator (e.g., an actuator that is functionally similar to a master cylinder, a brake booster, and an ABS pump). One example of such an emergency vehicle control system is Trailer Sway Control™ as implemented by Ford®. Trailer Sway Control™ is an algorithm to detect and reduce trailer sway after trailer sway begins. Some vehicles also include adaptive cruise control systems (e.g., ADAS, active drive assist) such as automatic cruise control (ACC, iACC), lane centering, and semi-autonomous driving (e.g., partially autonomous driving). One example of such a semi-autonomous driving system is BlueCruise™ as implemented by Ford®. The adaptive cruise control systems control vehicles, but do not support use with a trailer coupled to the vehicle. For example, in response to trailer sway occurring while driving, the ABS activates the vehicle brakes, but the brakes on the trailer are not activated.

Examples disclosed herein control trailer sway of a vehicle to reduce or eliminate the need to activate vehicle emergency controls. Examples disclosed herein prevent premature activation (e.g., unnecessary activation) of vehicle emergency controls by preventing the conditions that may trigger the activation of the vehicle emergency controls. Example vehicle control circuitry disclosed herein obtains sensor data from one or more sensors on the vehicle and/or the trailer. In some examples, prediction circuitry predicts, based on the sensor data, whether trailer sway is likely to occur. In such examples, example trailer sway avoidance circuitry is to activate, in response to a prediction that trailer sway is likely to occur, at least one vehicle control of the vehicle to prevent the trailer sway from occurring. As used herein, a vehicle control includes limiting the vehicle speed, cancelling autonomous driving, instructing the operator of the vehicle to resecure the load in the trailer, pre-charging a trailer sway control system, and/or reducing available vehicle torque. In some examples, the at least one vehicle control includes communicating with the operator of the vehicle to warn the operator of a load shift. In some examples, the vehicle control includes applying torque to a wheel of a trailer coupled to the vehicle.

Advantageously, examples disclosed herein prevent trailer sway conditions from occurring by predicting trailer sway conditions and reacting to the prediction by activating vehicle controls such as applying a torque to wheels of the trailer coupled to the vehicle. Some advantages of the examples disclosed herein include an improved maneuverability of the vehicle and a reduced need for user input.

FIG. 1 illustrates an example vehicle 100 and an example trailer 102 coupled thereto, where the vehicle 100 implements example trailer sway control circuitry 104 in accordance with teachings of this disclosure. In some examples, the trailer sway control circuitry 104 determines a load distribution and notifies an operator of the vehicle to adjust the load distribution on example vehicle wheels 106 (e.g., front vehicle wheels 106A, 106B, rear vehicle wheels 106C, 106D) and example trailer wheels 107A, 107B. In this example, the trailer sway control circuitry 104 is electrically and/or communicatively coupled to one or more example vehicle sensors 108 implemented on the vehicle 100 and/or one or more example trailer sensors 110 implemented on the trailer 102.

In the illustrated example of FIG. 1, the trailer 102 is coupled to the vehicle 100 via an example tongue 112 (e.g., trailer hitch). The trailer sway control circuitry 104 may determine various tongue loads (e.g., a stable tongue, a light tongue, a heavy tongue load) for a variety of roads (e.g., level ground, downhill, uphill, straight, curved, or a combination of the road type, etc.). As used herein, a stable tongue load is a load on the tongue 112 that is in between 10% and 15% of the weight of the vehicle 100. As used herein, a light tongue load is a load on the tongue 112 that is less than a first tongue load threshold (e.g., less than 10%). As used herein, a heavy tongue load is a load on the tongue 112 that is greater than a second tongue load threshold (e.g., greater than 15%).

In the illustrated example of FIG. 1, the trailer sway control circuitry 104 is communicatively and/or operatively coupled to a vehicle acceleration system 113 (e.g., torque system) to control operation thereof. In some examples, the vehicle acceleration system 113 is implemented by one or more electric motors 114 operatively coupled to respective ones of the vehicle wheels 106 (e.g., a vehicle acceleration system, an electric motor is coupled to the vehicle wheel 106A, etc.). In some examples, the vehicle acceleration system 113 is implemented by a first gas-powered axle 118A operatively coupled to the front vehicle wheels 106A, 106B and/or a second gas-powered axle 118B operatively coupled to the rear vehicle wheels 106C, 106D at respective ones of the vehicle wheels 106. For example, the trailer sway control circuitry 104 provides control signals to the vehicle acceleration system 113 to cause the vehicle acceleration system 113 to increase and/or decrease (e.g., apply a positive torque and/or apply a negative torque) to the vehicle wheels 106 (e.g., the front vehicle wheels 106A, 106B, and the rear vehicle wheels 106C, 106D). In some examples, the vehicle acceleration system 113 applies a negative torque to the vehicle wheels 106 by using example vehicle brakes 116A, 116B, 116C, 116D operatively coupled to respective ones of the vehicle wheels 106A, 106B, 106C, 106D.

The trailer sway control circuitry 104 is communicatively and/or operatively coupled to a trailer acceleration system 120 (e.g., trailer torque system) to control operation thereof. In some examples, the trailer acceleration system 120 is implemented by one or more electric motors 115A, 115B operatively coupled to respective ones of the trailer wheels 107 (e.g., a trailer acceleration system 120, an electric motor 115A that is coupled to the trailer wheel 107A). For example, the trailer sway control circuitry 104 provides control signals to the trailer acceleration system 120 to cause the trailer acceleration system 120 to increase and/or decrease torque (e.g., apply a positive torque and/or apply a negative torque) to the trailer wheels 107 (e.g., the trailer wheel 107A, the trailer wheel 107B).

In some examples, the trailer acceleration system 120 includes example trailer brakes 117A, 117B operatively coupled to respective ones of the trailer wheels 107A, 107B. In some examples, the trailer brakes 117 are regenerative brakes. In some examples, the trailer brakes 117 are conventional brakes.

In the illustrated example of FIG. 1, the trailer sway control circuitry 104 is communicatively coupled to one or more of the vehicle sensors 108 to obtain sensor data (e.g., vehicle sensor data) therefrom. In this example, the vehicle sensors 108 include one or more load sensors 108A (e.g., Onboard Scales (OBS™) as commercialized by Ford®), an example backup camera 108B (e.g., a rear camera), example ride height sensors 108C, an example yaw rate sensor 108D, an example vehicle pitch rate sensor 108E, an example vehicle roll rate sensor 108F, an example longitudinal acceleration sensor 108G, an example lateral acceleration sensor 108H, example wheel speed sensor(s) 108I, an example passenger detection sensor 108J (e.g., interior weight sensor), an example trailer hitch sensor 108K (e.g., Smart Hitch™ as commercialized by Ford®), an example front camera 108L, an example friction sensor 108M, an example mass estimation sensor 108N, an example driver state camera 108O, an example wheel torque sensor 108P, an example global positioning system (GPS) 108Q, and an example turn signal sensor 108R. In some examples, one or more other sensors may be used in addition to or instead of the vehicle sensors 108 shown in FIG. 1. In some examples, the trailer sway control circuitry 104 is further communicatively coupled to the example trailer sensors 110 to obtain trailer sensor data therefrom. The trailer sensor data can include, for example, a trailer pitch, a trailer weight, a trailer acceleration, load (e.g., weight) on a side of the trailer etc.

In this example, the vehicle sensors 108 and/or the trailer sensors 110 are configured to send sensor data (e.g., the vehicle sensor data and/or the trailer sensor data) to the trailer sway control circuitry 104 for use in predicting of a trailer sway condition associated with the vehicle 100.

In some examples, the trailer sway control circuitry 104 determines (e.g., calculates) and/or otherwise predicts a likelihood of trailer sway (e.g., a trailer sway likelihood score, a trailer sway probability) based on the sensor data. In such examples, the trailer sway control circuitry 104 compares the trailer sway likelihood score to one or more thresholds to determine whether trailer sway of the vehicle 100 and/or the trailer 102 is likely to occur. In some examples, in response to predicting that trailer sway of the vehicle 100 and/or the trailer 102 is likely to occur, the trailer sway control circuitry 104 notifies an operator of the vehicle 100 to adjust the load distribution of the vehicle 100 and/or the speed of the vehicle 100 to reduce a likelihood of the trailer sway occurring and/or improve maneuverability of the vehicle 100. In some examples, the trailer sway control circuitry 104 instructs the operator of the vehicle to pull over and adjust the load, which may have shifted during operation of the vehicle 100 and the trailer 102.

In the illustrated example of FIG. 1, the vehicle 100 includes an example user interface 130 to display instructions and/or indications to an operator of the vehicle 100. In some examples, the user interface 130 (e.g., a human machine interface (HMI)) is communicatively coupled to the trailer sway control circuitry 104. The trailer sway control circuitry 104, in response to predicting that trailer sway of the vehicle 100 and/or the trailer 102 is likely to occur, causes the user interface 130 to display an indication (e.g., a warning) to the operator that trailer sway is likely to occur. In some examples, the user interface 130 displays that the trailer sway has been detected. In some examples, the trailer sway control circuitry 104 causes the user interface 130 to display instructions to the operator. For example, the trailer sway control circuitry 104 can cause the user interface 130 to generate a visual and/or audible (e.g., verbal) instruction to the operator to increase a speed of the vehicle 100, reduce the speed of the vehicle 100, steer the vehicle 100 to a side of the road, etc. In some examples, the trailer sway control circuitry 104 is to activate a torque of the vehicle wheels 106 and/or activate a torque of the trailer wheels 107.

In some examples, the vehicle 100 is a conventionally fueled rear wheel drive truck that is pulling the trailer 102 (e.g., a tag trailer). In some examples, the vehicle wheels 106A, 106B, 106C, and 106D can provide a negative (e.g., decelerating) force on the vehicle 100. For example, a master cylinder or an anti-lock brake (e.g., ABS or EBB) pump can control the vehicle brakes 116A, 116B, 116C, 116D and an example integrated trailer brake controller 111, which can control the trailer brakes 117A, 117B to provide a negative force. In some examples, the rear vehicle wheels 106C, 106D may provide a positive (e.g., accelerating) force via the electric motors 114C, 114D and/or the second gas-powered axle 118B. In some examples where the trailer 102 is a conventional trailer without an electric motor coupled to the trailer wheels 107A, 107B, the trailer 102 may only provide negative force.

In some examples, the vehicle 100 is an electric vehicle, wherein ones of the vehicle wheels 106A, 106B, 106C, and 106D are connected to one or more electric motors, where each electric motor, in response to a signal, may apply a positive (e.g., accelerating) torque or a negative (e.g., decelerating) torque to one or more of the vehicle wheels 106. In some examples, a negative torque may be applied via a regenerative brake. In some examples, the trailer 102 is an electrically powered trailer, such that the trailer wheels 107A, 107B may provide a positive or a negative torque at the trailer wheels 107A, 107B via a connection to one or more electric motor.

Figure 2:
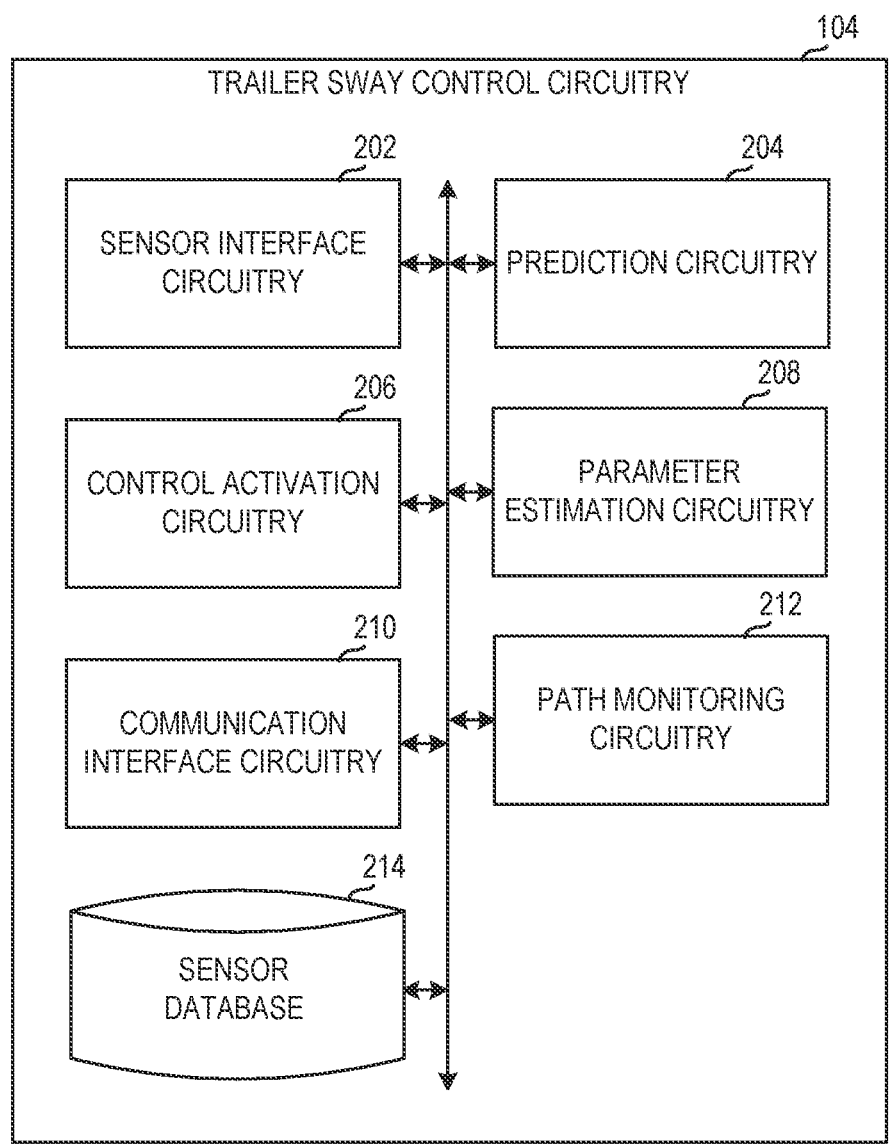
FIG. 2 is a block diagram of the trailer sway circuitry of FIG. 1.

FIG. 2 is a block diagram of the example trailer sway control circuitry 104 of FIG. 1. The trailer sway control circuitry 104 is to prevent trailer sway by monitoring load changes of the trailer 102 and/or changes in a projected path of the vehicle 100. The trailer sway control circuitry 104 of FIG. 2 may be instantiated (e.g., creating an instance of, bring into being for any length of time, materialize, implement, etc.) by processor circuitry such as a central processing unit executing instructions. Additionally or alternatively, the trailer sway control circuitry 104 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. In some examples, some or all of the circuitry of FIG. 2 may be implemented by microprocessor circuitry executing instructions to implement one or more virtual machines and/or containers.

The trailer sway control circuitry 104 includes example sensor interface circuitry 202, example prediction circuitry 204, example control activation circuitry 206, example parameter estimation circuitry 208, example communication interface circuitry 210, example path monitoring circuitry 212, and an example sensor database 214.

In the illustrated example of FIG. 2, the sensor interface circuitry 202 obtains and/or otherwise receives sensor data from the vehicle sensors 108 and/or the trailer sensors 110 of FIG. 1. In some examples, the sensor interface circuitry 202 retrieves sensor data from the sensor database 214. In some examples, the sensor interface circuitry 202 is instantiated by processor circuitry executing sensor interface instructions and/or configured to perform operations such as those represented by the flowcharts of FIGS. 7-9. Various sensor data types are described in connection with FIG. 3.

The sensor database 214 stores the sensor data utilized and/or obtained by the trailer sway control circuitry 104 and/or historical data (e.g., driver settings). The sensor database 214 of FIG. 2 is implemented by any memory, storage device and/or storage disc for storing data such as, for example, flash memory, magnetic media, optical media, solid state memory, hard drive(s), thumb drive(s), etc. Furthermore, the sensor data stored in the example sensor database 214 may be in any data format such as, for example, binary data, comma delimited data, tab delimited data, structured query language (SQL) structures, etc. While, in the illustrated example, the example sensor database 214 is illustrated as a single device, the sensor database 214 and/or any other data storage devices described herein may be implemented by any number and/or type(s) of memories. In some examples, the sensor database 214 is instantiated by processor circuitry executing sensor database instructions and/or configured to perform operations such as those represented by the flowcharts of FIGS. 7-9.

In the illustrated example of FIG. 2, the prediction circuitry 204 predicts whether a trailer sway condition is likely to occur. In some examples, the prediction circuitry 204 is instantiated by processor circuitry executing prediction instructions and/or configured to perform operations such as those represented by the flowcharts of FIGS. 7-9. For example, the prediction circuitry 204 determines (e.g., calculates) a trailer sway likelihood score (e.g., a trailer sway probability) based on sensor data. The prediction circuitry 204 retrieves (e.g., accesses) sensor data from the example sensor database 214 to make a prediction. In some examples, the prediction circuitry 204 determines if the load experienced at respective ones of the vehicle wheels 106 or the trailer wheels 107 meets manufacturer recommendations. For example, the example load sensor 108A may determine the load experienced at the vehicle wheel 106A and the load experienced at vehicle wheel 106B in substantially real-time and/or simultaneously. The parameter estimation circuitry 208 may perform calculations using the data generated from the load sensor 108A. The parameter estimation circuitry 208 may provide the calculated result to the prediction circuitry 204, for use in determining whether the load meets the manufacturer recommendations. In some examples, the prediction circuitry 204 may determine if the load experienced at a one or more of the vehicle wheels 106 and/or a one or more of the trailer wheels 107 is greater than a threshold. In some examples, the prediction circuitry 204 instructs the control activation circuitry 206 to apply, via the vehicle acceleration system 113 and/or the trailer acceleration system 120, torque to the vehicle wheels 106 and/or the trailer wheels 107 in response to the load not satisfying the manufacturer recommendations.

In the illustrated example of FIG. 2, the control activation circuitry 206 activates at least one vehicle control. In some examples, the control activation circuitry 206 is instantiated by processor circuitry executing trailer sway avoidance instructions and/or configured to perform operations such as those represented by the flowcharts of FIGS. 7-9. For example, to active the at least one vehicle control, the control activation circuitry 206 may apply a torque at one or more of the vehicle wheels 106 and/or one or more of the trailer wheels 107. The applied torque may increase acceleration (e.g., apply power, speed up, etc.) or decrease acceleration (e.g., brake, slow down, etc.) of the vehicle 100 and/or the trailer 102. For example, the control activation circuitry 206 provides one or more control signals to the vehicle acceleration system 113 to cause the vehicle acceleration system 113 to increase and/or decrease torque (e.g., apply a positive torque and/or apply a negative torque) to the vehicle wheels 106 (e.g., the front vehicle wheels 106A, 106B, and the rear vehicle wheels 106C, 106D) and/or to cause the trailer acceleration system 120 to increase and/or decrease torque (e.g., apply a positive torque and/or apply a negative torque) to the trailer wheels 107. In some examples, the control activation circuitry 206 causes the vehicle acceleration system 113 to apply a negative torque to the vehicle wheels 106 by using the vehicle brakes 116, and/or causes the trailer acceleration system 113 to apply a negative torque to the trailer wheels 107 using the trailer brakes 117.

In some examples, the vehicle 100 and the trailer 102 travel downhill along a curve. In such examples, the control activation circuitry 206 may apply a torque (e.g., a brake or negative acceleration) to the trailer 102 before applying a torque (e.g., a brake, or negative acceleration) to the vehicle 100. In such examples, the control activation circuitry 206 prevents the trailer 102 from accelerating faster than the vehicle 100 when travelling downhill.

In some examples, the control activation circuitry 206 may simultaneously (e.g., within 0.1 seconds) apply a negative torque to one or more of the trailer wheels 107 and apply a positive torque to one or more of the vehicle wheels 106. In such examples, a combination of the positive torque and the negative torque causes the vehicle 100 and the trailer 102 to move along a substantially straight path, thus reducing trailer sway. In some examples, the control activation circuitry 206 may apply a positive torque that is similar and/or substantially equal in magnitude to the negative torque. In such examples, the positive and negative torques do not cause unexpected and/or undesired changes in the speed of the vehicle 100 and the trailer 102, thus resulting in a more pleasant driving experience for the operator of the vehicle 100.

In some examples, where the vehicle 100 and the trailer 102 are accelerating out of a curve and the vehicle 100 and the trailer 102 is equipped with torque vectoring (e.g., mechanical or electrical), the control activation circuitry 206 limits the power to at least one inside wheel (e.g., the vehicle wheel 106 closer to the inside of the curve and/or the trailer wheel 107 closer to the inside of the curve) to prevent slip.

In some examples, prior to a curve, turn, or other road change, the control activation circuitry 206 adjusts suspension, steering, and/or braking of the vehicle 100 and/or the trailer 102. In such examples, the control activation circuitry 206 activates previously saved settings for adjusting the suspension, steering and/or braking in response to an upcoming road change. For example, the trailer sway control circuitry 104 may store a first setting for a first curve with a first turn radius in the sensor database 214 (e.g., a two hundred and fifty meter radius curve corresponds to setting A). The trailer sway control circuitry 104 may store a second setting for a second curve with a second turn radius in the sensor database 214 (e.g., a seven hundred and fifty meter radius curve corresponds setting B). The control activation circuitry 206 executes an acceleration protocol (e.g., a braking protocol) in response to the example path monitoring circuitry 212 determining that the first curve with the first turn radius is in the next road segment.

In some examples, while the vehicle 100 drives over the curve, the trailer sway control circuitry 104 stores a plurality of settings relating to the curve as historical data. For example, in response to the first setting based on the first curve resulting in a stable ride (e.g., a ride without activation of the vehicle emergency controls), the trailer sway control circuitry 104 stores the first setting in the sensor database 214. When a similar curve (e.g., a curve having a turn radius within a threshold percentage of the first turn radius) is approached, as determined by the path monitoring circuitry 212, the trailer sway control circuitry 104 retrieves the first setting and applies the first setting to achieve a similarly stable ride. In some examples, known machine learning or artificial intelligence techniques may be used to determine the similarity of the curves and/or associate the likelihood of trailer sway of the first setting to other curves that are within the threshold percentage. The path monitoring circuitry 212 determines features of the road segments based on images of the road and compares the features of the road segments to other road segments. As used herein, a "feature" of the road segment includes a curve length, an incline, a grade, a road condition (e.g., slippery, smooth, bumpy), a weather condition (e.g., sunny, snowing, raining).

In some examples, in response to the trailer sway control circuitry 104 predicting a trailer sway condition (e.g., not a stable ride) during navigation of the first curve based on the first settings, the trailer sway control circuitry 104 stores information associated with the predicted trailer sway condition with the first setting in the sensor database 214. The next time a similar curve is approached, the trailer sway control circuitry 104 may alter the first setting or select an alternative setting from the sensor database 214 that is more likely to result in a stable ride.

In some examples, the control activation circuitry 206 is to dynamically adjust trailer brake gain based on a grade of the road. For example, the sensor database 214 may store a first trailer brake gain setting for use with level (e.g., flat) ground, a second trailer brake gain setting for use with an uphill (e.g., positively inclined) grade, and a third trailer brake gain setting for use with a downhill (e.g., negatively inclined) grade. The trailer sway control circuitry 104, in response to the path monitoring circuitry 212 determining the grade of the road segment, may retrieve the trailer brake gain setting that corresponds to the grade of the road segment. The trailer sway control circuitry 104 then instructs the control activation circuitry 206 to adjust the trailer brake gain based on the trailer brake gain setting retrieved.

In some examples, the control activation circuitry 206 adjusts a normal force used in emergency control system techniques (e.g., ESC, ABS, TCS). As used herein, the normal force corresponds to a product of a mass of the vehicle 100, an acceleration of the vehicle 100, and the cosine of an angle theta, where theta corresponds to an angle of an inclined plane on which the vehicle 100 is resting. In some examples, the control activation circuitry 206 estimates the normal force based on estimated height at a center of gravity of the vehicle 100, measured acceleration of the vehicle 100 (e.g., lateral acceleration and/or longitudinal acceleration), an estimated bank of a road surface, and an estimated pitch of the road surface. For example, the load sensor 108A may determine load data 304 (FIG. 3) and the control activation circuitry 206 adjusts the normal load value based on the load data 304. The load data 304, determined by the load sensor 108A, results in a more accurate normal force baseline and more accurate dynamic normal force estimation on ones of the vehicle wheels 106 and ones of the trailer wheels 107. The more accurate normal force baseline and dynamic normal force estimation results in more accurate control, which enables the emergency control system techniques (e.g., ESC, ABS, TCS) to have more accurate starting torque targets. A more accurate starting torque target allows the emergency control system techniques to use all of the available grip at ones of the vehicle wheels 106 and/or the trailer wheels 107.

In some examples, the control activation circuitry 206 may increase or decrease the sensitivity to a trailer sway control technique based on predicted trailer sway. For example, the trailer sway control circuitry 104 may determine, based on a trailer load estimation and tongue load estimation, to increase or decrease the sensitivity of a trailer sway control technique before instructing the control activation circuitry 206 to either gain or lose sensitivity in the trailer sway control techniques.

In the illustrated example of FIG. 2, the parameter estimation circuitry 208 is to calculate data from the vehicle sensors 108, to be used by the example prediction circuitry 204. In some examples, the parameter estimation circuitry 208 is instantiated by processor circuitry executing parameter estimation instructions and/or configured to perform operations such as those represented by the flowcharts of FIGS. 7-9. For example, the parameter estimation circuitry 208 may estimate the load of the vehicle 100. As used herein, a load refers to cargo, occupants, and/or fuel carried by the trailer 102 and/or the vehicle 100. In some examples, the load corresponds to a mass or a weight (e.g., a force based on mass and acceleration). In some examples, the parameter estimation circuitry 208 estimates a total mass and/or a total weight of the vehicle 100 and/or the trailer 102 based on a vehicle weight of the vehicle 100, a trailer weight of the trailer 102, and the load carried by the vehicle 100 and/or the trailer 102.

The sensors (e.g., the load sensors 108A, the mass estimation sensor 108N, the trailer hitch sensor 108K, etc.) may determine the load (e.g., a mass that corresponds to the load, a weight that corresponds to the load) of the vehicle 100 and stores the value in the sensor database 214. The parameter estimation circuitry 208 may estimate the load of the vehicle 100 by using the values stored in the sensor database 214. For example, the parameter estimation circuitry 208 estimates the mass of the vehicle 100 and/or trailer 102 by using known mass estimation techniques. An example of a mass estimation technique includes comparing the vehicle acceleration with the torque applied to determine the mass of the vehicle 100.

The parameter estimation circuitry 208 may estimate the weight of the vehicle 100 based on different sources of sensor data. For example, a first sensor (e.g., the load sensor 108A) may determine that the weight of the vehicle 100 is a first value (e.g., five thousand pounds), while a second sensor (e.g., the trailer hitch sensor 108K) may determine that the weight of the vehicle 100 is a second value (e.g., four thousand pounds). The first value is stored in the example sensor database 214 and the second value is stored in the sensor database 214. In some examples, the parameter estimation circuitry 208 may estimate the weight based on the first value and the second value (e.g., may estimate the weight of the vehicle 100 to be four thousand and eight hundred pounds).

In the illustrated example of FIG. 2, the communication interface circuitry 210 communicates to an operator of the vehicle 100 via the user interface 130. In some examples, the communication interface circuitry 210 is instantiated by processor circuitry executing communication interface instructions and/or configured to perform operations such as those represented by the flowcharts of FIGS. 7-9. In some examples, the communication interface circuitry 210 controls a display of the user interface 130. In some examples, in response to the prediction circuitry 204 predicting that a trailer sway condition is likely to occur, the communication interface circuitry 210 causes the display of the user interface 130 to display an indication (e.g., a warning) to an operator of the vehicle 100. In some such examples, the communication interface circuitry 210 causes the display of the user interface 130 to display instructions to the operator, where the instructions instruct the operator to reduce a speed of the vehicle 100, increase the speed of the vehicle 100, pull the vehicle 100 over to a side of the road, resecure and/or redistribute a shifted load in the trailer 102, etc.

In the illustrated example of FIG. 2, the path monitoring circuitry 212 monitors a path of the vehicle 100 and/or the trailer 102. In some examples, the path monitoring circuitry 212 is instantiated by processor circuitry executing path monitoring instructions and/or configured to perform operations such as those represented by the flowcharts of FIGS. 7-9. For example, the path monitoring circuitry 212 may detect an upcoming road change (e.g., a stop sign, a speed limit, a curve) in the projected path of the vehicle 100 based on images generated by the example front camera 108L. In some examples, the front camera 108L is implemented by a radar sensor or a lidar sensor and the images generated are radar images or lidar images. In some examples, the path monitoring circuitry 212 determines a speed limit along segments of a road on which the vehicle 100 is to travel. For example, the example path monitoring circuitry 212 may determine a first road segment that has a first speed limit (e.g., fifty miles per hour), and a second road segment that has a second speed limit (e.g., forty miles per hour). The trailer sway control circuitry 104 may use the indication from the path monitoring circuitry 212 to determine a torque to apply to vehicle wheels 106 and/or the trailer wheels 107. For example, the trailer sway control circuitry 104 uses the path monitoring circuitry 212 to detect upcoming road changes (e.g., route metrices, vehicle path data 312), and the example prediction circuitry 204 uses the upcoming road changes to determine if a trailer sway condition is likely to occur. In response to determining that a trailer sway condition is likely to occur, the trailer sway control circuitry 104 may instruct the control activation circuitry 206 to apply a torque to ones of the vehicle wheels 106 and/or the trailer wheels 107.

In some examples, the trailer sway control circuitry 104 includes means for obtaining sensor data. For example, the means for obtaining sensor data may be implemented by the sensor interface circuitry 202. In some examples, the sensor interface circuitry 202 may be instantiated by processor circuitry such as the example processor circuitry 1012 of FIG. 10. For instance, the sensor interface circuitry 202 may be instantiated by the example microprocessor 1100 of FIG. 11 executing machine executable instructions such as those implemented by at least block 702 of FIG. 7, block 802 of FIG. 8, and block 902 of FIG. 9. In some examples, the sensor interface circuitry 202 may be instantiated by hardware logic circuitry, which may be implemented by an ASIC, XPU, or the FPGA circuitry 1200 of FIG. 12 structured to perform operations corresponding to the machine readable instructions. Additionally or alternatively, the sensor interface circuitry 202 may be instantiated by any other combination of hardware, software, and/or firmware. For example, the sensor interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the trailer sway control circuitry 104 includes means for monitoring the vehicle 100. For example, the means for monitoring the vehicle may be implemented by the prediction circuitry 204. In some examples, the prediction circuitry 204 may be instantiated by processor circuitry such as the example processor circuitry 1012 of FIG. 10. For instance, the prediction circuitry 204 may be instantiated by the example microprocessor 1100 of FIG. 11 executing machine executable instructions such as those implemented by at least blocks 704, 714 of FIG. 7, blocks 812, 818 of FIG. 8, and blocks 904, 914 of FIG. 9. In some examples, the prediction circuitry 204 may be instantiated by hardware logic circuitry, which may be implemented by an ASIC, XPU, or the FPGA circuitry 1200 of FIG. 12 structured to perform operations corresponding to the machine readable instructions. Additionally or alternatively, the prediction circuitry 204 may be instantiated by any other combination of hardware, software, and/or firmware. For example, the prediction circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the trailer sway control circuitry 104 includes means for predicting, based on sensor data from one or more sensors of the vehicle, whether a trailer sway condition is likely to occur. For example, the means for predicting, based on sensor data from one or more sensors of the vehicle, whether a trailer sway condition is likely to occur may be implemented by the prediction circuitry 204. In some examples, the prediction circuitry 204 may be instantiated by processor circuitry such as the example processor circuitry 1012 of FIG. 10. For instance, the prediction circuitry 204 may be instantiated by the example microprocessor 1100 of FIG. 11 executing machine executable instructions such as those implemented by at least block 906 of FIG. 9. In some examples, the prediction circuitry 204 may be instantiated by hardware logic circuitry, which may be implemented by an ASIC, XPU, or the FPGA circuitry 1200 of FIG. 12 structured to perform operations corresponding to the machine readable instructions. Additionally or alternatively, the prediction circuitry 204 may be instantiated by any other combination of hardware, software, and/or firmware. For example, the prediction circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the trailer sway control circuitry 104 includes means for activating at least one vehicle control of the vehicle to prevent the trailer sway condition from occurring. For example, the means for activating at least one vehicle control of the vehicle to prevent the trailer sway condition from occurring may be implemented by the control activation circuitry 206. In some examples, the control activation circuitry 206 may be instantiated by processor circuitry such as the example processor circuitry 1012 of FIG. 10. For instance, the control activation circuitry 206 may be instantiated by the example microprocessor 1100 of FIG. 11 executing machine executable instructions such as those implemented by at least blocks 710, 712 of FIG. 7, blocks 808, 816 of FIG. 8, and block 910 of FIG. 9. In some examples, the control activation circuitry 206 may be instantiated by hardware logic circuitry, which may be implemented by an ASIC, XPU, or the FPGA circuitry 1200 of FIG. 12 structured to perform operations corresponding to the machine readable instructions. Additionally or alternatively, the control activation circuitry 206 may be instantiated by any other combination of hardware, software, and/or firmware. For example, the control activation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the trailer sway control circuitry 104 includes means for applying torque to a wheel of a trailer coupled to the vehicle. For example, the means for applying torque to a wheel of a trailer coupled to the vehicle may be implemented by the control activation circuitry 206 and/or the trailer acceleration system 120. In some examples, the control activation circuitry 206 may be instantiated by processor circuitry such as the example processor circuitry 1012 of FIG. 10. For instance, the control activation circuitry 206 may be instantiated by the example microprocessor 1100 of FIG. 11 executing machine executable instructions such as those implemented by at least block 912 of FIG. 9. In some examples, the control activation circuitry 206 may be instantiated by hardware logic circuitry, which may be implemented by an ASIC, XPU, or the FPGA circuitry 1200 of FIG. 12 structured to perform operations corresponding to the machine readable instructions. Additionally or alternatively, the control activation circuitry 206 may be instantiated by any other combination of hardware, software, and/or firmware. For example, the control activation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the trailer sway control circuitry 104 includes means for estimating load at ones of the vehicle wheels and/or trailer wheels. For example, the means for estimating load at ones of the vehicle wheels and/or trailer wheels may be implemented by the parameter estimation circuitry 208. In some examples, the parameter estimation circuitry 208 may be instantiated by processor circuitry such as the example processor circuitry 1012 of FIG. 10. For instance, the parameter estimation circuitry 208 may be instantiated by the example microprocessor 1100 of FIG. 11 executing machine executable instructions such as those implemented by at least block 804 of FIG. 8. In some examples, the parameter estimation circuitry 208 may be instantiated by hardware logic circuitry, which may be implemented by an ASIC, XPU, or the FPGA circuitry 1200 of FIG. 12 structured to perform operations corresponding to the machine readable instructions. Additionally or alternatively, the parameter estimation circuitry 208 may be instantiated by any other combination of hardware, software, and/or firmware. For example, the parameter estimation circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the trailer sway control circuitry 104 includes means for warning an operator via a human machine interface. For example, the means for warning an operator via a human machine interface may be implemented by communication interface circuitry 210. In some examples, the communication interface circuitry 210 may be instantiated by processor circuitry such as the example processor circuitry 1012 of FIG. 10. For instance, the communication interface circuitry 210 may be instantiated by the example microprocessor 1100 of FIG. 11 executing machine executable instructions such as those implemented by at least block 810 of FIG. 8. In some examples, the communication interface circuitry 210 may be instantiated by hardware logic circuitry, which may be implemented by an ASIC, XPU, or the FPGA circuitry 1200 of FIG. 12 structured to perform operations corresponding to the machine readable instructions. Additionally or alternatively, the communication interface circuitry 210 may be instantiated by any other combination of hardware, software, and/or firmware. For example, the communication interface circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the trailer sway control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface circuitry 202, the example prediction circuitry 204, the example control activation circuitry 206, the example parameter estimation circuitry 208, the example communication interface circuitry 210, the example path monitoring circuitry 212, the example sensor database 214, and/or, more generally, the example trailer sway control circuitry 104 of FIG. 1, may be implemented by hardware alone or by hardware in combination with software and/or firmware. Thus, for example, any of the example sensor interface circuitry 202, the example prediction circuitry 204, the example control activation circuitry 206, the example parameter estimation circuitry 208, the example communication interface circuitry 210, the example path monitoring circuitry 212, the an example sensor database 214, and/or, more generally, the example trailer sway control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example trailer sway control circuitry 104 of FIG. 1 may include one or more elements, processes, and/or devices in addition to, or instead of, those illustrated in FIG. 2, and/or may include more than one of any or all of the illustrated elements, processes and devices.

Figure 3:
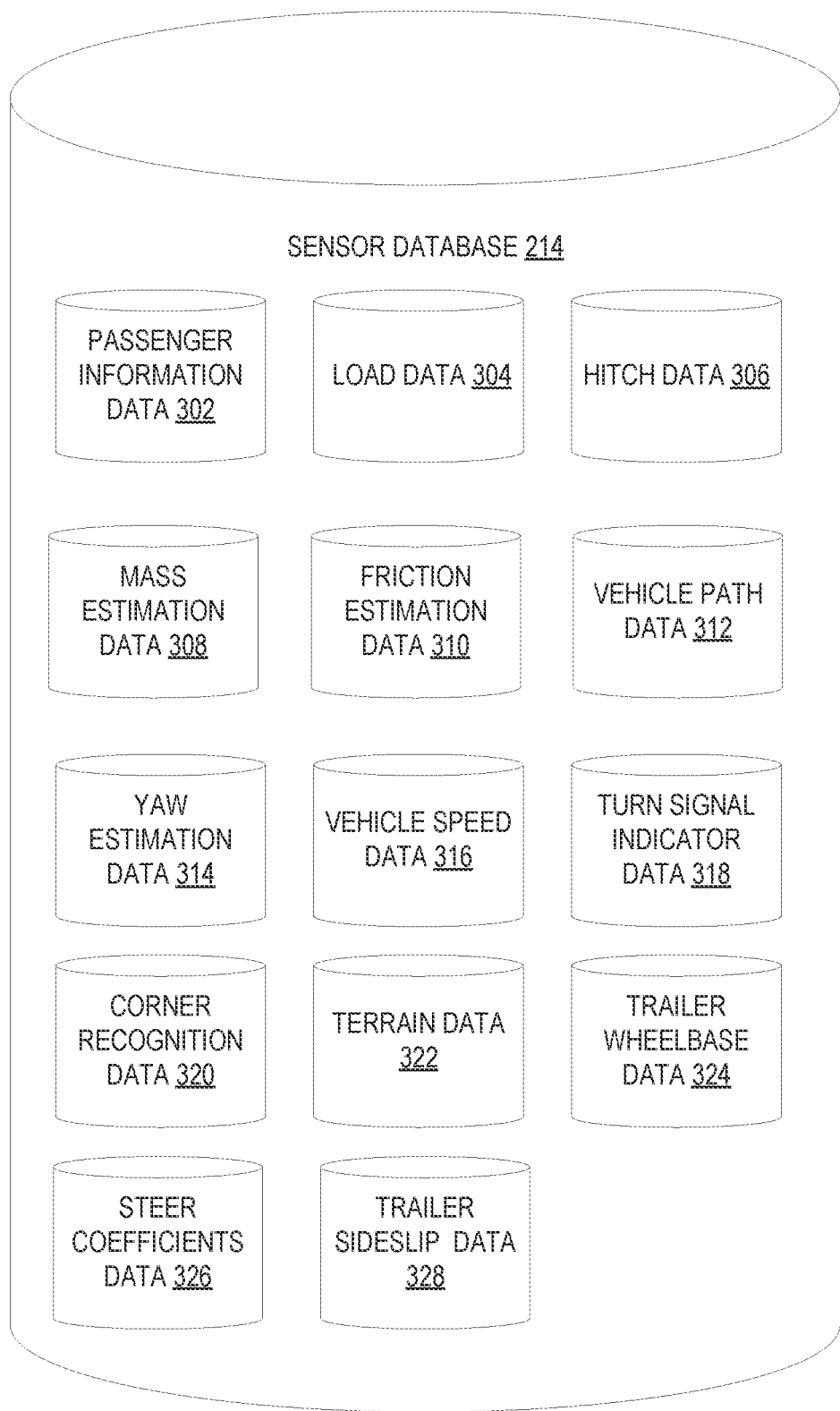
FIG. 3 is a block diagram of types of sensor data used by the trailer sway circuitry of FIG. 2.

FIG. 3 is a block diagram of types of sensor data used by the trailer sway control circuitry 104 of FIG. 2. Example sensor data types are included in the sensor database 214. The sensor database 214 includes example passenger information data 302, example load data 304, example hitch data 306, example mass estimation data 308, example friction estimation data 310, example vehicle path data 312, example yaw estimation data 314, example vehicle speed data 316, example turn signal indicator data 318, example corner recognition data 320, example terrain data 322, example wheelbase data 324, example steer coefficients data 326, and example trailer sideslip data 328.

In some examples, the passenger information data 302 may be representative of a number, location, and/or load (e.g., mass, weight) of passengers in the vehicle 100. For example, the passenger information data 302 may represent two passengers on the left side of the vehicle 100 generating an approximate load (e.g., three hundred and five pounds). In some examples, the passenger detection sensor 108J (e.g., a seat sensor, a weight sensor) may determine the weight of the passengers by measuring the weight of the passengers. In some examples, the passenger detection sensor 108J is implemented by a seatbelt sensor. For example, once the seatbelt is locked, the passenger detection sensor 108J determines that a passenger is sitting in the seat, and the parameter estimation circuitry 208 estimates a load (e.g., weight) based on the number of locked seatbelts. In some examples, the driver state camera 1080 (e.g., a passenger camera) may determine the location of the passengers of the vehicle based on image data. In such examples, the parameter estimation circuitry 208 may, based on the images of the passengers generated by the driver state camera 1080, determine the location of the passengers of the vehicle and generate the passenger information data 302. In some examples, an operator of the vehicle 100 may input the number of passengers and the respective seats of the passengers via the user interface 130 of FIG. 1. The parameter estimation circuitry 208 may, based on the input number of passengers and respective seats, determine the passenger information data 302 by estimating a passenger weight and assigning the estimated passenger weight to a corresponding seat.

The example load data 304 represents the load (e.g., weight, mass) at ones of the vehicle wheels 106 and/or the trailer wheels 107. The load sensors 108A generate the example load data 304. The load data 304 may be used by the trailer sway control circuitry 104 to determine whether a load shift has occurred. For example, during operation of the vehicle 100 coupled to the trailer 102, a load of the trailer 102 (e.g., cargo in the trailer 102) may move toward a front end of the trailer 102. In some examples, the load shift may affect operation of the vehicle 100. The trailer sway control circuitry 104 may determine to apply a torque (e.g., acceleration, deceleration) to ones of the vehicle wheels 106 and/or ones of the trailer wheels 107 in response to the load shift. In some examples, the trailer sway control circuitry 104 may determine a magnitude and direction of the load shift based, partly, on the load data 304. In some examples, the communication interface circuitry 210 communicates the magnitude and direction of the load shift to the operator. An operator of the vehicle 100 may determine that a small load shift (e.g., less than 10% of towing capability) does not require the operator to slow the vehicle 100 to a stop, while a large load shift (e.g., greater than 10% of towing capability) requires a stop. In some examples, the towing capability is based on a size of the vehicle 100. For example, the trailer sway control circuitry 104 may determine that a two hundred pound load shift is a large load shift for a first truck, while the two hundred pound load shift is a small load shift for a second truck larger than the first truck. In some examples, towing capability information for the vehicle 100 may be preloaded in the trailer sway control circuitry 104.

The example hitch data 306 represents the load of the trailer 102. For example, the example backup camera 108B (e.g., camera in the taillight of the vehicle 100, rear view camera) may generate images of the trailer 102 with respect to the ground (e.g., surface, road). The parameter estimation circuitry 208 may determine the load (e.g., weight, mass) of the trailer 102 based on the images generated by the example backup camera 108B. The parameter estimation circuitry 208 may determine, based on the height of the trailer 102 in the image captured by the example backup camera 108B, the load of the trailer 102. In some examples, the parameter estimation circuitry 208 determines a roll angle or a pitch angle of the trailer 102 relative to the ground (e.g., surface, road). The parameter estimation circuitry 208 retrieves images captured by the example backup camera 108B to estimate the load of the trailer 102. In some examples, the hitch data 306 is used to determine the tongue load (e.g., stable tongue load, light tongue load, heavy tongue load) as the load of the trailer 102 is compared to the load experienced by the tongue 112.

The mass estimation data 308 represents the mass of the vehicle 100 and the trailer 102. For example, the parameter estimation circuitry 208 executes mass estimation techniques based on comparing the acceleration of the vehicle 100 and/or the trailer 102 with the torque application to determine a combined mass of the vehicle 100 and the trailer 102. For example, a wheel torque sensor 108P determines the amount of torque (e.g., force) based on the energy provided by from the axle or the electric motor to the vehicle wheels 106 and/or the trailer wheels 107. The longitudinal acceleration sensor 108G and/or the lateral acceleration sensor 108H determines the acceleration of the vehicle 100 and/or the trailer 102. The parameter estimation circuitry 208 based on the example torque applied and the example acceleration estimates the example mass of the vehicle 100 and/or the trailer 102. In some examples, the trailer 102 is not coupled to the vehicle 100, such that the example mass estimation algorithm determines the mass of the vehicle 100 based on the torque applied at the vehicle wheels 106 and the acceleration of the vehicle 100. In some examples, one or more other methods (e.g., a user input, etc.) may be used to estimate the mass of the vehicle 100 and/or the trailer 102.

The example friction estimation data 310 represents frictional forces applied to respective ones of the vehicle wheels 106A, 106B, 106C, 106D. The friction sensor 108M determines the terrain (e.g., surface, road, ground) and the available wheel grip that corresponds to the terrain. For example, the friction sensor 108M may detect the type of terrain (e.g., asphalt, gravel, rocky, woodland, etc.) based on an image captured by a camera (e.g., the backup camera 108B, the front camera 108L). The parameter estimation circuitry 208 estimates the frictional forces of ones of the vehicle wheels 106 and/or the trailer wheels 107 based on the type of detected terrain. In some examples, the parameter estimation circuitry 208 estimates the frictional forces based on the emergency control systems (e.g., ESC, TCS, ABS). For example, the parameter estimation circuitry 208 may use emergency control based friction estimates. In such examples, the emergency control systems friction estimates are generated when the vehicle wheels 106 and/or the trailer wheels 107 are sliding and/or in a non-linear response range. In some examples, the parameter estimation circuitry 208 uses one or more artificial intelligence (AI) or machine learning (ML) models to estimate the frictional forces. In particular, the parameter estimation circuitry 208 can provide vision-based terrain data 322 (e.g., generated by the backup camera 108B or the front camera 108L) and/or the emergency control systems frictional estimates as input to the AI/ML model(s). In response to execution of the AI/ML model(s), the parameter estimation circuitry 208 outputs the friction estimation data 310. In some examples, the friction sensor 108M is to determine the frictional force based on a road condition (e.g., snow, ice, mud, and/or wet conditions) detected in the vision-based terrain data 322. For example, when the vehicle 100 is driven in inclement weather conditions (e.g., a rainstorm, a snowstorm, etc.), the parameter estimation circuitry 208 determines that a frictional coefficient between the road and the vehicle wheels 106 is reduced compared to when the vehicle 100 is driven in sunny, dry conditions.

The vehicle path data 312 may represent path data (e.g., monitoring data) corresponding to events happening on the road (e.g., surface, path) ahead. For example, the vehicle path data 312 may be generated based on images captured by the front camera 108L and/or based on data from the Global Positioning System (GPS) 108Q of the vehicle 100. For example, the front camera 108L captures images of a projected path of the vehicle 100, and the path monitoring circuitry 212 may detect an upcoming road change (e.g., a stop sign, a speed limit, a curve) in the projected path based on any known image recognition techniques. The projected path of the vehicle 100 may include a first portion of road on which the vehicle 100 is to travel at a first speed, and a second portion of road on which the vehicle 100 is to travel at a second speed different from the first speed. For example, the vehicle path data 312 may determine that the speed limit for the first portion of straight road is fifty miles per hour, while the second portion of road is a curve that has a speed limit of forty miles per hour. In some examples, the vehicle path data 312 includes a grade (e.g., incline and/or decline) of the road and/or weather conditions. In some examples, vehicle path data 312 (e.g., Electronic Horizon® data) is used for supplying road network information to a vehicle's on-board computer that can be used to support other vehicle systems, namely, automatic headlight aiming, intersection detection, adaptive cruise control, lane keeping, curve warning, and similar vehicle control measures.

After the path monitoring circuitry 212 determines upcoming road changes, the prediction circuitry 204 uses the determined upcoming road changes to predict whether a trailer sway condition is likely to occur. For example, the prediction circuitry 204 may determine a trailer sway condition is likely to occur by determining the speed of the vehicle 100 and the tongue load and the radius of the curve. In some examples, other data in the sensor database 214 in addition to the vehicle path data 312 is used by the prediction circuitry 204 to predict whether a trailer sway condition is likely to occur. In some examples, the friction sensor 108M includes a surface condition sensor to detect road surface conditions on a road surface (e.g., detect a presence of snow, ice, mud, and/or moisture on the road surface). In such examples, the friction sensor 108M determines weather condition data based on the road surface conditions, where the weather condition data indicates whether sunny conditions, rainy conditions, snowy conditions, etc. are present. In some examples, the friction sensor 108M updates the vehicle path data 312 to include the weather condition data. In some examples, the prediction circuitry 204 determines, based on the vehicle path data 312 and/or the weather condition data, that a trailer sway condition is more likely to occur. For example, the prediction circuitry 204 may determine that the trailer sway condition is more likely to occur during snowy conditions compared to during dry and sunny conditions. The control activation circuitry 206 accelerates or decelerates the vehicle 100 and the trailer 102 in response to an indication from the prediction circuitry 204 that a trailer sway condition is likely to occur. By accelerating or decelerating the vehicle 100 and the trailer 102, the control activation circuitry 206 is to cause the vehicle 100 and the trailer 102 to avoid the likely trailer sway condition. For example, in response to determining that the second portion of road is a curve with a second speed limit, the control activation circuitry 206 is to apply a torque to the trailer wheels 107.

The example vehicle speed data 316 may be representative of a travel speed of the vehicle 100 and/or the trailer 102. The vehicle speed data 316 may be generated based on input from an accelerometer (e.g., the longitudinal acceleration sensor 108G, the lateral acceleration sensor 108H, etc.). In some examples, the prediction circuitry 204 may use the vehicle speed data 316 to determine a first speed (e.g., a threshold speed) at which that the vehicle 100 and the trailer 102 are traveling. The example prediction circuitry 204 uses the first speed (e.g., threshold speed) to determine a speed threshold that the example prediction circuitry 204 may use to compare to a second speed. In some examples, when the second speed is different than the first speed (e.g., threshold speed), the example prediction circuitry 204 may determine that an example trailer sway condition is likely to occur.

The turn signal indicator data 318 represents when a right turn signal and/or a left turn signal is activated. For example, the turn signal sensor 108R determines when a turn signal is activated. In some examples, the trailer sway control circuitry 104 uses the prediction circuitry 204 to predict whether the vehicle 100 is to turn right or left based on the turn signal indicator data 318. As such, the turn signal indicator data 318 can be used to predict actions, maneuvers, and/or turns to be executed by the vehicle 100.

The corner recognition data 320 identifies one or more corners (e.g., curves) in a projected path of the vehicle 100. For example, the prediction circuitry 204 of FIG. 2 generates the corner recognition data 320 based on images captured by the example front camera 108L of FIG. 1 and/or based on GPS data from the GPS 108Q of FIG. 1.

The terrain data 322 represents the road surface conditions. In some examples, the backup camera 108B and/or the front camera 108L generates the terrain data 322 indicating whether the road surface has snow, ice, rain, mud thereon and/or whether the road surface is dry. In some examples, the parameter estimation circuitry 208 executes an artificial intelligence or machine learning model based on the terrain data 322 to estimate the friction estimation data 310.

The trailer wheelbase data 324 represents relative positions (e.g., locations) of the trailer wheels 107. In particular, the trailer wheelbase data 324 represents a distance between the pivot point on the tongue 112 and the trailer wheels 107 on the trailer 102. In some examples, the trailer sway control circuitry 104 generates the trailer wheelbase data 324 based on input from the operator of the vehicle 100 into the communication interface circuitry 210. In some examples, the trailer sway control circuitry 104 generates, with the parameter estimation circuitry 208, the trailer wheelbase data 324 based on image data of the vehicle wheels 106 that is generated by the backup camera 108B.

The steer coefficients data 326 includes understeer coefficient(s) and/or oversteer coefficient(s) of the vehicle 100. As disclosed herein, an "understeer coefficient" refers to a measure of change between a steering wheel angle of the vehicle 100 and a trajectory curvature of the vehicle 100 as a function of the lateral acceleration of the vehicle 100. In some examples, the trailer sway control circuitry 104 generates, with the parameter estimation circuitry 208, the steer coefficients data 326 based on data from the yaw rate sensor 108D, the lateral acceleration sensor 108H, the hitch data 306 and/or the GPS 108Q. In some examples, the trailer sway control circuitry 104 uses the steer coefficients data 326 (e.g., the understeer coefficient(s) and/or the oversteer coefficient(s)) and the wheelbase data 324 to estimate likelihood of trailer sway.

In some examples, a tongue load percentage is determined based on the hitch data 306. In such examples, as the tongue load percentage decreases, the trailer sway control circuitry 104 determines that the vehicle 100 and the trailer 102 tend towards oversteer (e.g., corresponding to a negative understeer coefficient), which reduces a critical speed of the vehicle 100 and the trailer 102. In particular, a negative tongue load tends to reduce the critical speed of the vehicle 100 and the trailer 102. In some examples, the prediction circuitry 204 determines a speed at which a trailer sway is likely to occur (e.g., a critical speed) based on the steer coefficients data 326 and the wheelbase data 324. In some examples, the control activation circuitry 206 reduces a travel speed of the vehicle 100 and the trailer 102 to a speed significantly slower than the critical speed.

In some examples, the trailer sway control circuitry 104 generates the trailer sideslip data 328 based on a trailer hitch angle measurement determined based on image data from the vehicle backup camera 108B. In some examples, the trailer sway control circuitry 104 uses the trailer sideslip data 328 to determine whether a trailer sway condition is likely to occur.

In some examples, the example trailer sway control circuitry 104 uses other combinations of data included in the example sensor database 214 to predict vehicle instabilities.

Figure 4A:
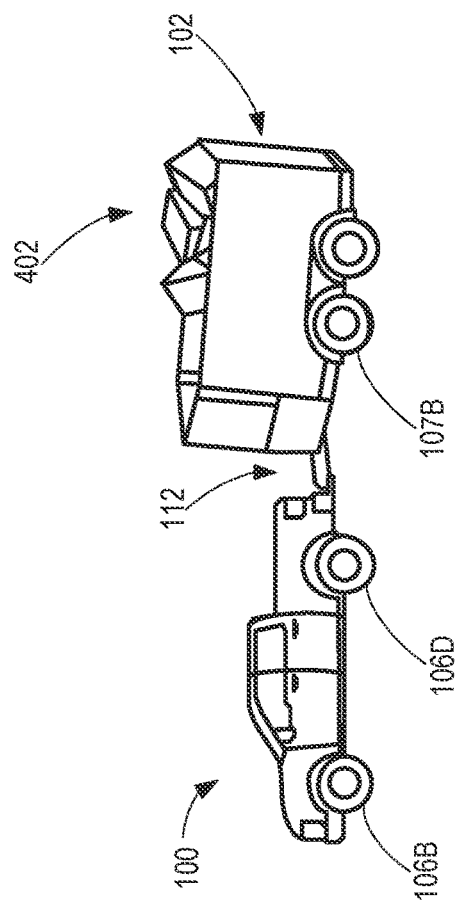
FIG. 4A is a side view of the trailer and the vehicle of FIG. 1 having a first load distribution.

FIG. 4A is a side view of the trailer 102 and the vehicle 100 of FIG. 1 having a first load distribution. In this example, the trailer 102 is coupled to the vehicle 100 by via the tongue 112 (e.g., a hitch). Sensor data from the load sensor 108A may be used to determine the load 402 (e.g., weight, mass) in the trailer 102. During operation of the vehicle 100 and the trailer 102, the load 402 may shift in the trailer 102. Based on the position of the weight (e.g., the load 402, a load shift), the strain or stress experienced by the tongue 112 may change, while the total weight of the vehicle 100 and the trailer 102 remains unchanged. A lighter tongue load causes that the rear vehicle wheels 106C, 106D to have less normal force and, as a result, less traction. Additionally, the lighter tongue load may result in the trailer 102 being more prone to sway.

In the example of FIG. 4A, the weight of the vehicle 100 is six thousand pounds, the weight of the trailer 102 and the load 402 of the trailer 102 is ten thousand pounds, and the combined weight of the vehicle 100 and the trailer 102 is sixteen thousand pounds. In this example, the trailer sway control circuitry 104 may determine that there is one occupant (e.g., operator, driver) based on the passenger information data 302. In some examples, the passenger information data 302 is generated using the passenger detection sensor 108J (e.g., a weight sensor in the seat, seatbelt information), the driver state camera 108O, or the communication interface circuitry 210 (e.g., the driver inputs into a display that there is only one occupant).

For example, the trailer sway control circuitry 104 may determine that the weight of the vehicle 100 is based on vehicle configuration information, occupant information, the load data 304 generated by the load sensors 108A, the hitch data 306, and the mass estimation techniques. For example, the trailer sway control circuitry 104 may determine that the weight of the trailer 102 is based on the load data 304, the hitch data 306, and the mass estimation techniques. In some examples, the combined weight of the vehicle 100 and the trailer 102 is determined from the mass estimation techniques.

In the example of FIG. 4A, the trailer sway control circuitry 104 determines that the load 402 in the trailer 102 is shifted towards the rear of the trailer 102. For example, the trailer sway control circuitry 104 may determine, based on the position of the load 402, that the stress or strain on the tongue 112 is light (e.g., less than a stable threshold, 8%, less than 10%, etc.). In response to the light tongue determination, the trailer sway control circuitry 104 may increase a sensitivity setting (e.g., increase a control authority to a trailer sway control system). In some examples, in response to the light tongue determination, the trailer sway control circuitry 104 may bias additional deceleration torque from the rear axle of the vehicle 100 (e.g., from the rear vehicle brakes 116C, 116D) to the trailer 102 (e.g., to the trailer brakes 117). For example, based on a torque request (e.g., a braking request), the trailer sway control circuitry 104 may use either the rear vehicle brakes 116C, 116D, the trailer brakes 117, or a combination of the rear vehicle brakes 116C, 116D and the trailer brakes 117 to supply the desired total torque in the torque request. In examples in which a combination of the rear vehicle brakes 116C, 116D and the trailer brakes 117 are used, the trailer sway control circuitry 104 may use more torque from the trailer brakes 117 than the rear vehicle brakes 116C, 116D. For example, the trailer sway control circuitry 104 may cause seventy-five percent of the deceleration torque of the rear vehicle brakes 116C, 116D to be used and twenty-five percent of the deceleration torque of the trailer brakes 117 to be used. As a result, the trailer sway control circuitry 104 biases the torque from the rear vehicle brakes 116C, 116D to the trailer brakes 117. In some such examples, the trailer sway control circuitry 104 does not cause a change in torque from the front vehicle brakes 116A, 116B.

The trailer sway control circuitry 104 (e.g., the prediction circuitry 204) may determine an upcoming path change (e.g., speed change, upcoming curve, upcoming turn etc.) and apply additional deceleration torque to the trailer 102 before the applying deceleration torque to the vehicle 100. In some examples, the trailer sway control circuitry 104 applies trailer brakes 117 during an Electronic Stability Control (ESC) activation process in response to a predicted trailer sway condition.

Figure 4B:
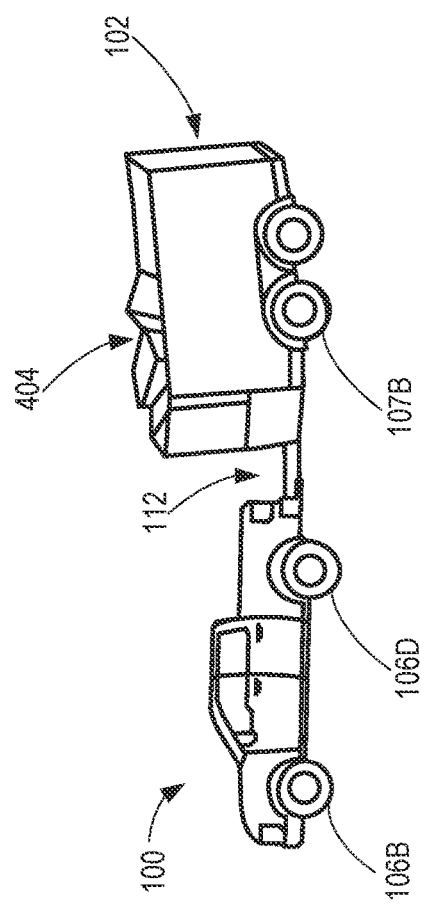
FIG. 4B is a side view of the trailer and the vehicle of FIG. 1 having a second load distribution.

FIG. 4B is a side view of the trailer 102 and the vehicle 100 of FIG. 1 having a second load distribution. The load 404 is positioned near the front of the trailer 102, resulting in a heavy tongue load. The heavy tongue load may indicate that there is a smaller downward force on the front vehicle wheels 106A, 106B compared to the rear vehicle wheels 106C, 106D. The reduced downward force on the front wheels 106A, 106B results in reduced steering effectiveness of the vehicle 100. The reduced downward force on the front wheels 106A, 106B also results in a reduction in torque capacity (e.g., braking capacity) of the front axle 118A of the vehicle 100. The trailer sway control circuitry 104 may determine, from the load data 304, the hitch data 306, and the mass estimation data 308, that there is a heavy tongue load (e.g., a stress or strain greater than 15%). The trailer sway control circuitry 104 may determine to reduce sensitivity and decrease control authority to of a trailer sway control system. In some examples, reducing a sensitivity to a trailer sway control system avoids nuisance unnecessary activation thereof. In some examples, the trailer sway control circuitry 104 may bias additional acceleration torque and deceleration torque to the vehicle rear axle. In some examples, the trailer sway control circuitry 104 may bias understeer control torque to the vehicle rear axle 118B.

In the example of FIG. 4A, the trailer sway control circuitry 104 may, in response to determining that the tongue load is less than the first tongue load threshold (e.g., a light tongue load), increase a sensitivity setting of the trailer sway control circuitry 104 and decelerate at least one of the one or more trailer wheels 107. In the example of FIG. 4B, the trailer sway control circuitry 104 may, in response to determining that the tongue load is greater than the second tongue load threshold (e.g., a heavy tongue load), decrease a sensitivity setting to the trailer sway control circuitry 104 and decelerate a rear vehicle wheel 106C, 106D.

Figure 5:
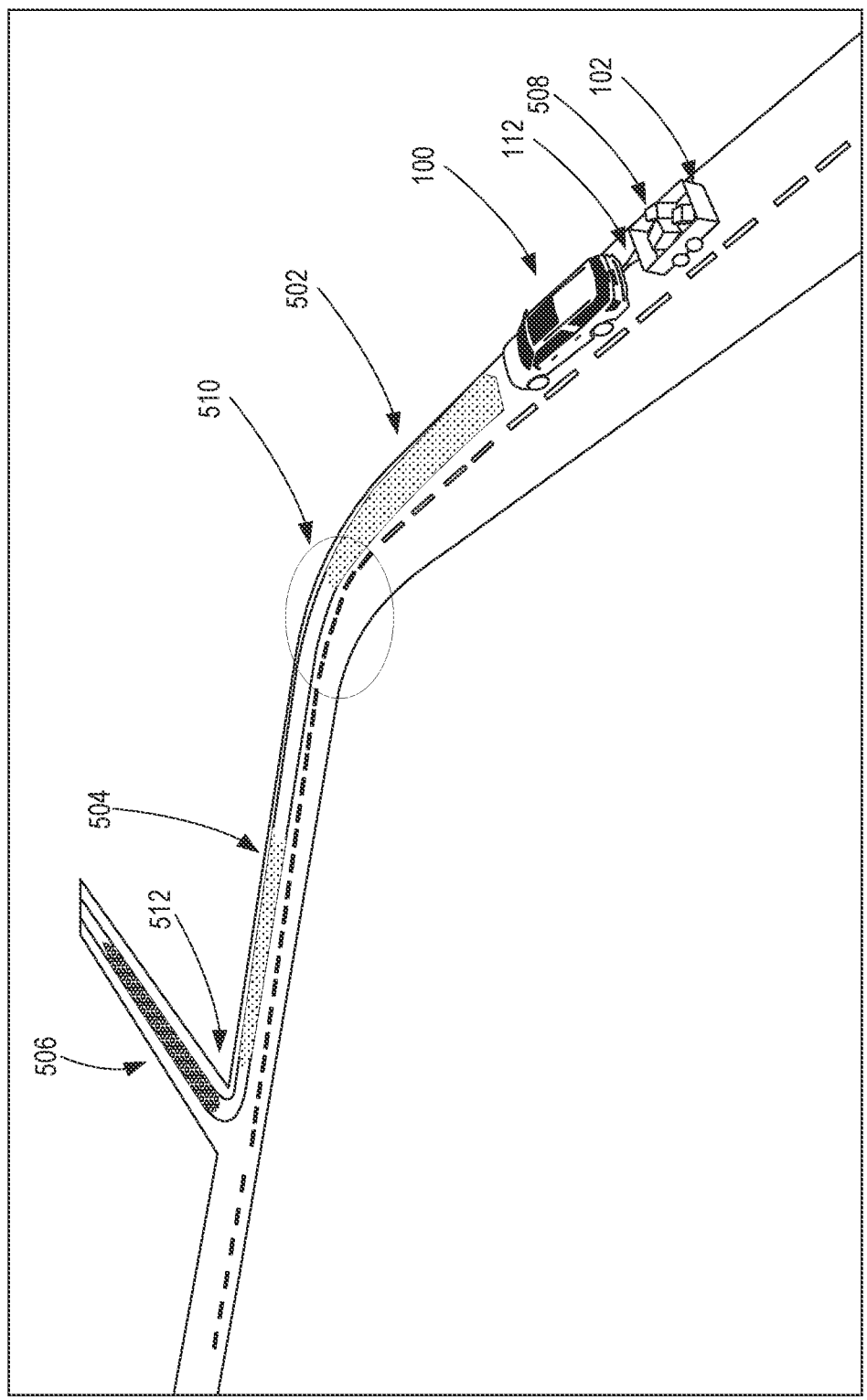
FIG. 5 is an illustration of the vehicle and trailer of FIG. 1 driving on a road that includes a curve.

FIG. 5 is an illustration of the vehicle 100 and the trailer 102 of FIG. 1 driving on a road that includes a curve. In this example, the vehicle 100 and trailer 102 are traveling on an example first road segment 502 at a cruise control speed. The path monitoring circuitry 212 determines that there is an example second road segment 504 and an example third road segment 506 following the first road segment 502. The path monitoring circuitry 212 determines that the first road segment 502 includes an example curve 510 based on images captured by the front camera 108L. The path monitoring circuitry 212 generates the vehicle path data 312 that identifies the upcoming curve 510. In some examples, the path monitoring circuitry 212 continuously and/or periodically generates the vehicle path data 312. During travel of the vehicle 100 and the trailer 102 along the road, the prediction circuitry 204 of the trailer sway control circuitry 104 monitors for a likelihood of trailer sway conditions. In some examples, the path monitoring circuitry 212 determines road segments (e.g., the first road segment 502) based on a suggested and/or planned path determined by a navigation system and/or an autonomous driving system of the vehicle 100. For example, the path monitoring circuitry 212 retrieves the suggested path from the autonomous driving system implemented by an on-board computer of the vehicle 100, and determines the road segments, curves, and/or turns based on the suggested path.

In the example of FIG. 5, an example load 508 (e.g., cargo) is evenly distributed in the trailer 102 (e.g., does not result in a heavy tongue load or a light tongue load). Thus, the prediction circuitry 204 determines, based on sensor data (e.g., the load data 304), that the loads experienced at respective ones of the vehicle wheels 106 and the trailer wheels 107 satisfy (e.g., are within) a predetermined threshold (e.g., each of the vehicle wheels 106 and trailer wheels 107 are within the predetermined threshold). In other examples, when the load (e.g., normal force) experienced at one of the vehicle wheels 106 or one of the trailer wheels 107 were to exceed the predetermined threshold, the prediction circuitry 204 determines that a trailer sway condition is likely to occur. In response to the prediction circuitry 204 predicting that a trailer sway condition is likely to occur, the control activation circuitry 206 activates at least one vehicle control to prevent the trailer sway condition from occurring.

In the example of FIG. 5, the prediction circuitry 204 may, based on the vehicle path data 312 generated by the path monitoring circuitry 212, determine that the upcoming curve 510 in the first road segment 502 is likely to result in a trailer sway condition. The prediction circuitry 204 may then determine that a speed change is required to avoid the likely trailer sway condition based on the upcoming curve 510 in the first road segment 502. In some examples, the prediction circuitry 204 first determines whether a reduction in speed will avoid the predicted likely trailer sway condition. Further, the prediction circuitry 204 determines whether to reduce the speed using the trailer brakes 117 (e.g., regenerative trailer braking) or whether to reduce the speed using both the vehicle brakes 116 and the trailer brakes 117. In some examples, the prediction circuitry 204 uses friction estimation data 310 to determine whether the trailer brakes 117 are sufficient to reduce the speed or if the vehicle brakes 116 in combination with the trailer brakes 117 are to reduce the speed. In the example of FIG. 5, the control activation circuitry 206 instructs the trailer system to activate the trailer brakes 117 and/or the vehicle brakes 116 based on the determination by the prediction circuitry 204.

In the example of FIG. 5, the path monitoring circuitry 212 determines that the second road segment 504 includes an example turn 512. In some examples, the prediction circuitry 204 determines there is a likely trailer sway condition based on the speed of the vehicle 100 and a radius of the turn 512. In some examples, to prevent the likely trailer sway condition, the prediction circuitry 204 determines that the vehicle brakes 116 and the trailer brakes 117 are to be activated to slow the vehicle 100 and the trailer 102 to less than a threshold speed to execute the turn 512.

In some examples, the prediction circuitry 204 determines that the vehicle brakes 116 and/or the trailer brakes 117 are to be activated to reduce the speed of the vehicle 100 and the trailer 102 based on an estimated friction coefficient between the vehicle wheels 106 and the road determined by the friction sensor 108M. In some examples, the friction sensor 108M estimates the friction coefficient based on detected road conditions (e.g., whether the road is dry, wet, etc.). Further, the prediction circuitry 204 detects a radius of an upcoming corner or turn. In some examples, based on the friction coefficient and the detected radius, the prediction circuitry 204 reduces the speed of the vehicle 100 and the trailer 102 (e.g., by activating the vehicle brakes 116 and/or the trailer brakes 117) to slow the vehicle 100 down to less than a threshold speed. In particular, the threshold speed is selected such that a lateral acceleration of the vehicle 100 and the trailer 102 is less than a threshold lateral acceleration when travelling along the turn. In some examples, the threshold lateral acceleration corresponds to a percentage (e.g., 50%) of the friction coefficient multiplied by a gravitational constant g.

In some examples, if the friction sensor 108M determines that the road is snow-covered, the prediction circuitry 204 determines that the friction coefficient between the road and the vehicle wheels 106 is 0.25. In such examples, the prediction circuitry 204 determines a speed for the upcoming corner or turn that results in a lateral acceleration that is less than or equal to the threshold lateral acceleration. For example, if the friction coefficient is 0.25, the prediction circuitry 204 selects a speed such that the lateral acceleration of the vehicle 100 and the trailer 102 is less than or equal to 0.125 multiplied by the gravitational constant g. In such examples, reducing the vehicle speed improves driver comfort and/or reduces slippage of the vehicle wheels 106 when the vehicle 100 and the trailer 102 travel along the turn 512.

In some examples, the prediction circuitry 204 is to distinguish (e.g., differentiate) between a curve (e.g., where the front camera 108L is able to detect additional road segments that lie beyond the curve) and a turn (e.g., where the front camera 108L is prevented from detecting additional road segments that lie beyond the turn). In some examples, the difference between a curve and a turn is based on a stub angle determined from image data generated by the front camera 108L.

In the example of FIG. 5, the path monitoring circuitry 212 determines that the third road segment 506 is a straight path. The prediction circuitry 204 determines that likelihood of a trailer sway condition is low (e.g., less than a condition threshold). In such examples, the prediction circuitry 204 instructs the vehicle acceleration 113 to accelerate the vehicle 100 (e.g., speed up the vehicle 100) and the trailer 102 coupled to the vehicle 100 for the third road segment 506 after the turn in the second road segment 504. In some examples, the vehicle 100 and trailer 102 is accelerated back to a cruise control speed.

FIG. 6 is a table representative of trailer sway likelihood determination. For example, the table 600 may numerically represent a likelihood of a trailer sway condition occurring. The table 600 includes an example vehicle weight column 602, an example trailer weight column 604, an example estimated center of gravity (CG) 606, an example tongue load column 608, and an example trailer sway likelihood score column 610. In some examples, the prediction circuitry 204 is to determine the likelihood of a trailer sway condition occurring based on the vehicle weight, the trailer weight, an estimated center of gravity, an estimated tongue load (e.g., determined from the hitch data 306), the wheelbase data 324, the steer coefficients data 326, and/or the trailer sideslip data 328. In the example of FIG. 6, a first row 612 of the table 600 lists represents the vehicle 100 (e.g., a first vehicle) with a weight of five thousand pounds and a trailer 102 with a weight of ten thousand pounds. In this example, the first row also indicates that the vehicle 100 has a low center of gravity and a tongue load of twenty percent. Further, in the example of the first row 612, the trailer sway likelihood score is a four out of ten.

In some examples, in response to the trailer sway likelihood score being over a score threshold, the trailer sway control circuitry 104 may activate safety controls using the control activation circuitry 206. Some examples of vehicle safety controls include applying a torque (e.g., an acceleration or a deceleration) to the trailer 102. In some examples, the trailer sway control circuitry 104 may instruct the operator of the vehicle to pull over and resecure the load. Resecuring the load may alter the tongue load percentage and lower the trailer sway likelihood score.

For example, in response to the trailer sway likelihood score being between zero and three, the trailer sway control circuitry 104 may determine that the trailer sway likelihood score is not above the score threshold and, thus, does not activate a safety control. In some examples, at a trailer sway likelihood score of four, the trailer sway control circuitry 104 is to increase trailer braking. In some examples, at a trailer sway likelihood score of five, the trailer sway control circuitry 104 is to activate (e.g., pre-charge) the TCS, ESC, RSC, and TSC systems and increase sensitivity thereof. In some examples, at a trailer sway likelihood score of six, the trailer sway control circuitry 104 is to warn a driver of the vehicle 100 to adjust the load in the trailer 102. In some examples, at a trailer sway likelihood score of seven, the trailer sway control circuitry 104 is to reduce propulsion torque (e.g., forward torque) of the vehicle 100. In some examples, at a trailer sway likelihood score of eight, the trailer sway control circuitry 104 is to reduce the maximum speed to less than or equal to a first threshold speed (e.g., eighty kilometers per hour, forty nine miles per hour, etc.). In some examples, at a trailer sway likelihood score of nine, the trailer sway control circuitry 104 is to reduce the maximum speed to less than or equal to a second threshold speed (e.g., thirty kilometers per hour, eighteen miles per hour, etc.) less than the first threshold speed. In some examples, at a trailer sway likelihood score of ten, the trailer sway control circuitry 104 is to reduce the maximum speed to less than or equal to a third threshold speed (e.g., five kilometers per hour, three miles per hour, etc.) less than the first threshold speed and the second threshold speed. In some examples, the trailer sway control circuitry 104 executes the safety controls corresponding to a first trailer sway likelihood score at a second drive trailer sway likelihood score, where the second trailer sway likelihood score is greater than the first trailer sway likelihood score. For example, at a trailer sway likelihood score of nine, the trailer sway control circuitry 104 can execute safety controls corresponding to a trailer sway likelihood score of seven (e.g., reducing the propulsion torque) in addition to safety controls corresponding to the trailer sway likelihood score of nine (e.g., reducing the maximum vehicle speed to approximately thirty kilometers per hour).

The other rows of the table 600 illustrate other trailer sway likelihood scores. For example, the second row 614 illustrates that the load in the trailer 102 refers to a stable tongue load (e.g., fifteen percent) and results in a trailer sway likelihood score of two. For example, the third row 616 illustrates that the load in the trailer 102 refers to a slightly light tongue load (e.g., below ten percent) and results in a trailer sway likelihood score of seven. For example, the fourth row 618 illustrates that the trailer 102 is not coupled to the vehicle 100 which results in a trailer sway likelihood score of one. For example, the fifth row 620 illustrates that the load in the trailer 102 refers to a very light tongue load (e.g., five percent or less) and results in a trailer sway likelihood score of ten. As used herein, a lower trailer sway likelihood score indicates a reduced probability of a trailer sway condition occurring (e.g., a trailer sway condition with a trailer sway likelihood score of one is less likely to occur than a trailer sway condition with a trailer sway likelihood score of two).

Figure 7:
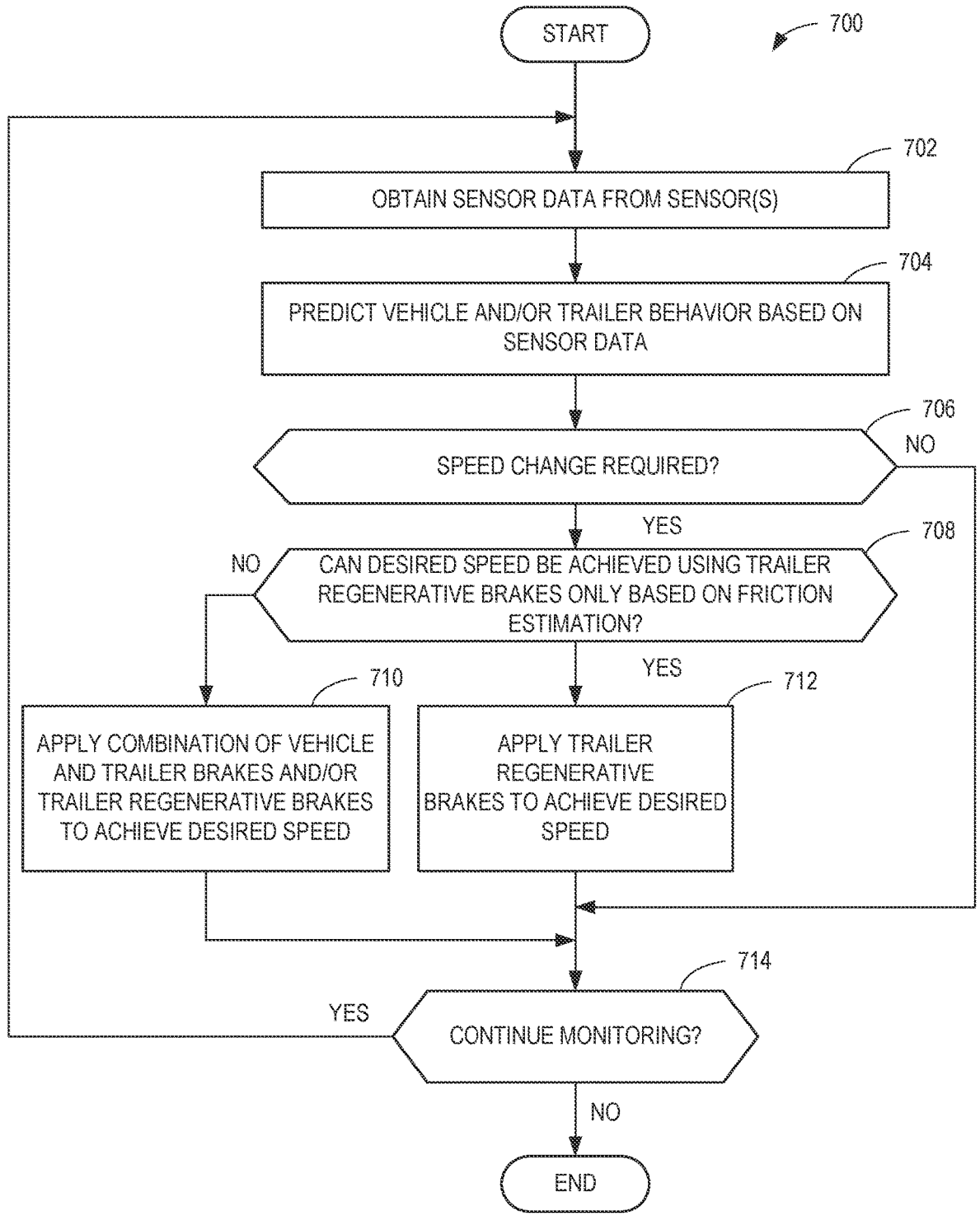
FIG. 7 is a flowchart representative of example machine readable instructions that may be executed by example processor circuitry to implement the example trailer sway circuitry of FIG. 2 to determine if a speed change will decrease trailer sway.
Figure 8:
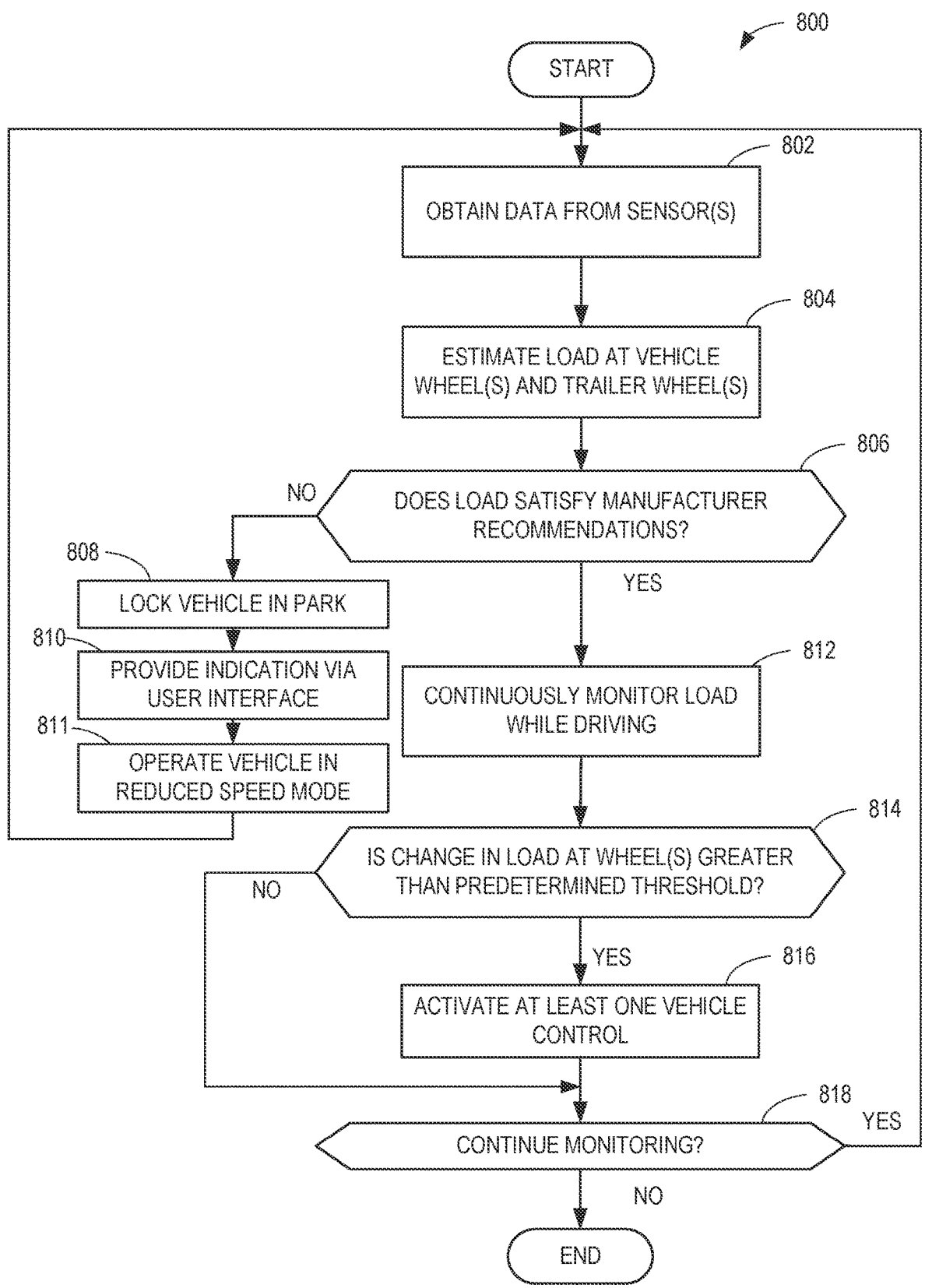
FIG. 8 is a flowchart representative of example machine readable instructions that may be executed by example processor circuitry to implement the example trailer sway circuitry of FIG. 2 to monitor the load at the wheels of the vehicle and the trailer to prevent trailer sway.
Figure 9:
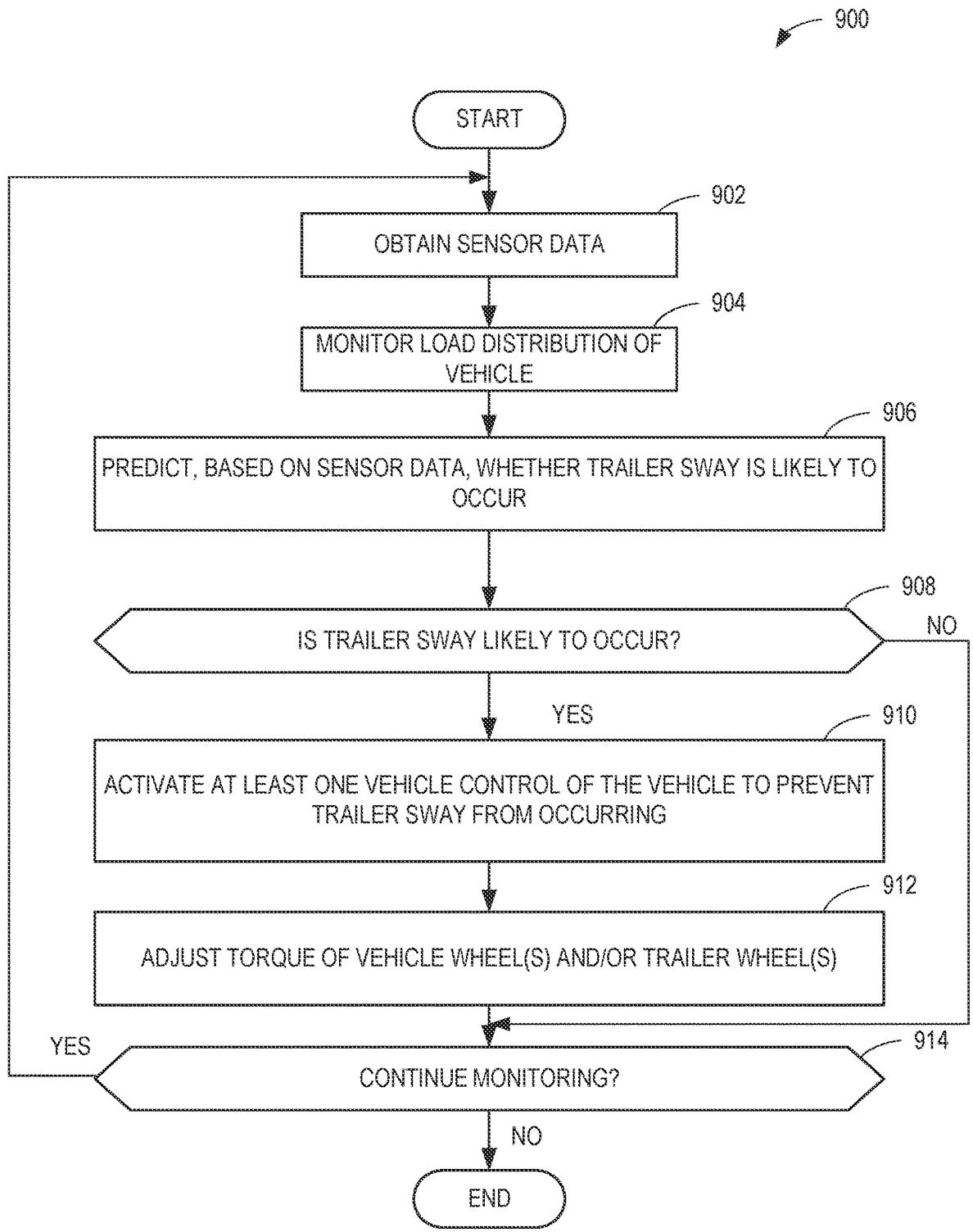
FIG. 9 is a flowchart representative of example machine readable instructions that may be executed by example processor circuitry to implement the example trailer sway circuitry of FIG. 2 to prevent trailer sway by applying torque to at least one wheel of the vehicle and/or the trailer.

Flowcharts representative of example machine readable instructions, which may be executed to configure processor circuitry to implement the trailer sway control circuitry 104 of FIG. 2, are shown in FIGS. 7-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-9, many other methods of implementing the example trailer sway control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an", "first", "second", etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to implement the example trailer sway control circuitry 104 of FIG. 2 to determine whether a speed change will decrease likelihood of trailer sway. The machine readable instructions and/or operations 700 of FIG. 7 begin at block 702, at which the example trailer sway control circuitry 104 obtains sensor data from one or more of the vehicle sensors 108 and/or one or more of the trailer sensors 110 of FIG. 1. For example, the example sensor interface circuitry 202 of FIG. 2 obtains and/or otherwise receives the sensor data from the vehicle sensors 108 and/or the trailer sensors 110. In some examples, the sensor data includes passenger information data 302 (e.g., a number of passengers and the seats that are occupied by the number of passengers), load data 304 (e.g., a load at the vehicle wheels 106 and/or the trailer wheels 107, a load at the tongue 112, etc.), hitch data 306 (e.g., a position of the tongue 112 relative to the trailer 102 and the vehicle 100, the ride height of the trailer 102 relative to the vehicle 100), mass estimation data 308 (e.g., a combined weight of the vehicle 100 and the weight of the trailer 102), friction estimation data 310 (e.g., a frictional force of the vehicle wheels 106 and/or trailer wheels 107 relative to the ground), vehicle path data 312 (e.g., upcoming turns, speed changes, inclines, declines in a vehicle path), yaw estimation data 314 (e.g., left/right acceleration of the vehicle 100), vehicle speed data 316, turn signal indicator data 318 (e.g., determining a predicted turn based on an indication from the turn signal), corner recognition data 320 (e.g., based on image data), terrain data 322 (e.g., road conditions such as muddy, wet, snowy, dry, etc.), wheelbase data 324 (e.g., the relative positions of the vehicle wheels 106), steer coefficients data 326 (e.g., understeer coefficients and/or oversteer coefficients of the vehicle 100), and/or trailer sideslip data 328 (e.g., whether the trailer 102 is likely to slip to a lateral side).

At block 704, the trailer sway control circuitry 104 predicts behavior of the vehicle 100 and/or the trailer 102. For example, the prediction circuitry 204 of FIG. 2 predicts, based on the sensor data, a likelihood of trailer sway occurring. For example, the prediction circuitry 204 predicts the likelihood of trailer sway occurring by calculating a trailer sway likelihood score (e.g., as shown in the table 600 of FIG. 6) based on a vehicle weight, a trailer weight, a center of gravity estimate, and a tongue load. The tongue load may be a determination such as light tongue load, stable tongue load, or heavy tongue load based on the percentage of the tongue load relative to trailer weight. For example, a tongue load that is less than ten percent of the trailer weight is a light tongue load, while a tongue load that is more than fifteen percent of the trailer weight is a heavy tongue load. In some examples, the prediction circuitry 204 predicts the likelihood trailer sway of the vehicle 100 by comparing a manufacturer recommended speed with a speed measured by the wheel speed sensor(s) 108I.

At block 706, the trailer sway control circuitry 104 determines if a speed change is required for the vehicle 100. For example, the prediction circuitry 204 may determine whether, based on the sensor data and a predicted trailer sway, a speed change of the vehicle 100 is required to avoid the likely trailer sway. For example, the vehicle 100 may be traveling on a road which has a first curve. The prediction circuitry 204 determines that based on the upcoming curve, the current speed, and the distribution of the load of the trailer 102 and the load on the tongue 112 that there is a likely trailer sway condition. The prediction circuitry 204 determines a speed change (e.g., reducing the speed, applying a negative torque) will avoid the likely trailer sway condition. For example, in response to the prediction circuitry 204 determining a speed change is not required (e.g., block 706 returns a result of NO), control flows to block 714. Alternatively, in response to the prediction circuitry 204 determining a speed change is required (e.g., block 706 returns a result of YES), control flows to block 708.

At block 708, the prediction circuitry 204 determines whether a desired speed of the vehicle 100 can be achieved using the trailer brakes 117 alone. For example, the prediction circuitry 204 may determine a required torque to achieve a desired speed of the vehicle 100 and the trailer 102 based on friction estimation data 310. The friction estimation data 310 is used to estimate the frictional forces of ones of the vehicle wheels 106 and/or trailer wheels 107 based on the type of detected terrain. The prediction circuitry 204 uses the friction estimation data 310 generated from the parameter estimation circuitry 208 to determine whether the trailer brakes 117 (e.g., regenerative braking) will achieve the desired speed of the vehicle 100 and the trailer 102 or whether the vehicle brakes 116 are also needed to achieve the desired speed of the vehicle 100 and the trailer 102. For example, in response to the prediction circuitry 204 determining that the desired speed can be achieved using only regenerative brakes of the trailer 102 (e.g., block 708 returns a result of YES), control flows to block 712. For example, in response to the prediction circuitry 204 determining that the desired speed cannot be achieved using only the regenerative brakes (e.g., block 708 returns a result of NO), control flows to block 710.

At block 710, the trailer sway control circuitry 104 applies a combination of trailer regenerative braking and vehicle braking. For example, the control activation circuitry 206 may instruct a braking system connected to the trailer 102 (e.g., the trailer brakes 117) to apply a first decelerating torque and a braking system connected to the vehicle 100 (e.g., the vehicle brakes 116) to apply a second decelerating torque. The combination of the first decelerating torque and the second decelerating torque will change the speed of the vehicle 100 and the trailer 102. In some examples, the first decelerating torque to reduce the speed of the trailer 102 is applied before the second decelerating torque to reduce the speed of the vehicle 100. The order in applying the different decelerating torques may reduce likelihood of a trailer sway condition. Control flows to block 714.

At block 712, the trailer sway control circuitry 104 applies trailer regenerative braking. For example, the control activation circuitry 206 may instruct a braking system connected to the trailer 102 (e.g., the trailer brakes 117 of FIG. 1) to apply a decelerating torque to the trailer wheels 107A, 107B. The decelerating torque may be applied using the trailer brakes 117. In some examples, a speed change may be caused by an electric motor connected to the trailer wheels 107A, 107B. Control flows to block 714.

At block 714, the trailer sway control circuitry 104 determines to continue monitoring the behavior of the vehicle 100 and/or the trailer 102. In some examples, the vehicle 100 has completed the trip and is powered off, so the trailer sway control circuitry 104 determines to not continue monitoring the behavior of the vehicle 100 and/or the trailer 102 when the vehicle 100 completes a trip and/or is powered off. For example, in response to the trailer sway control circuitry 104 determining to continue monitoring (e.g., block 714 returns a result of YES), control returns to block 702. For example, in response to the trailer sway control circuitry 104 determining to not continue monitoring (e.g., block 714 returns a result of NO), control ends.

FIG. 8 is a flowchart representative of example machine readable instructions and/or example operations 800 that may be executed and/or instantiated by processor circuitry to implement the example trailer sway control circuitry 104 of FIG. 2 to monitor the load at the wheels of the vehicle and the trailer to prevent a trailer sway. The machine readable instructions and/or operations 800 of FIG. 8 begin at block 802, at which the trailer sway control circuitry 104 obtains sensor data from one or more of the vehicle sensors 108 and/or one or more of the trailer sensors 110 of FIG. 1. For example, the sensor interface circuitry 202 of FIG. 2 obtains and/or otherwise receives the sensor data from the vehicle sensors 108 and/or the trailer sensors 110. In some examples, the sensor data includes passenger information data 302 (e.g., a number of passengers and the seats that are occupied by the number of passengers), load data 304 (e.g., a load at the vehicle wheels 106 and/or the trailer wheels 107, a load at the tongue 112, etc.), hitch data 306 (e.g., a position of the tongue 112 relative to the trailer 102 and the vehicle 100, the ride height of the trailer 102 relative to the vehicle 100), mass estimation data 308 (e.g., estimating the combined weight of the vehicle 100 and the weight of the trailer 102), friction estimation data 310 (e.g., representing a frictional force of the vehicle wheels 106 and/or trailer wheels 107 relative to the ground), vehicle path data 312

(e.g., representing upcoming turns, speed changes, inclines, declines based on image data), yaw estimation data 314 (e.g., representing left/right acceleration of the vehicle 100), vehicle speed data 316, turn signal indicator data 318 (e.g., indicating a predicted turn based on an indication from the turn signal), and corner recognition data 320 (e.g., based on image data).

At block 804, the trailer sway control circuitry 104 estimates the load at ones of the vehicle wheels 106 and the trailer wheels 107. For example, the parameter estimation circuitry 208 determines, based on the sensor data, determine a load at each of the vehicle wheels 106 of the vehicle 100 (e.g., vehicle wheels 106) and trailer wheels 107 of the trailer 102 (e.g., trailer wheels 107). In some examples, the loads at the trailer wheels 107 are measured using the load sensor 108A.

At block 806, the trailer sway control circuitry 104 determines if the load satisfies a manufacturer recommendation. For example, a manufacturer recommendation for a load may be stored in the sensor database 214. In some examples, the parameter estimation circuitry 208 compares the estimated loads at each of the vehicle wheels 106 and/or the trailer wheels 107 to the respective manufacturer recommendations. In some examples, the parameter estimation circuitry 208 determines that the estimated load meets the manufacturer recommendations when a difference between the estimated load and a manufacturer-recommended load at a particular wheel is less than a threshold difference. In response to the parameter estimation circuitry 208 determining that an estimated load for at least one wheel does not satisfy manufacturer recommendations (e.g., block 806 returns a result of NO), control flows to block 808. In response to the parameter estimation circuitry 208 determining that the estimated load does satisfy manufacturer recommendations (e.g., block 806 returns a result of YES), control flows to block 812. The prediction circuitry 204 may determine if the load meets manufacturer recommendations while the vehicle 100 and the trailer 102 are stationary or moving. In some examples, before the vehicle 100 has started moving and while the vehicle 100 is stationary, if the load does not meet manufacturer recommendation, the prediction circuitry 204 instructs the control activation circuitry 206 to lock the vehicle wheels 106 of the vehicle 100 to prevent movement. In some examples, while the vehicle 100 is moving, if the load does not satisfy manufacturer recommendations, the control activation circuitry 206 applies a negative torque to slow down and/or stop the vehicle so that an operator of the vehicle 100 may re-adjust the load.

At block 808, the trailer sway control circuitry 104 locks the vehicle 100 in park. For example, the control activation circuitry 206 may control a torque on the vehicle wheels 106 and the trailer wheels 107 through the vehicle brakes 116 and the trailer brakes 117 to lock the vehicle 100 in park.

At block 810, the trailer sway control circuitry 104 provides an indication via the user interface 130 of FIG. 1 (e.g., HMI). For example, the communication interface circuitry 210 of FIG. 2 causes the user interface 130 to display the indication, where the indication can indicate a trailer sway condition is likely to occur. Additionally or alternatively, the example indication can include operator instructions to the operator of the vehicle 100, where the operator instructions instruct the operator to increase a speed of the vehicle 100, reduce the speed of the vehicle 100, pull the vehicle 100 to a side of the road, and/or resecure a load in the trailer 102.

At block 811, the trailer sway control circuitry 104 operates the vehicle 100 in a reduced-speed mode. The trailer sway control circuitry 104 engages the reduced-speed mode in response to the communication interface circuitry 210 retrieving an acknowledgement from the operator of the vehicle 100. For example, the operator of the vehicle 100, in response to the trailer sway condition indication presented by the communication interface circuitry 210 at block 810, may acknowledge, via user input to the communication interface circuitry 210, receipt of the trailer sway condition indication. The reduced-speed mode may correspond to a walking speed (e.g., 5 kph or less) or a speed that is predetermined during vehicle development to facilitate re-loading and/or re-calculation of loading while the vehicle 100 and the trailer 102 are on flat, level ground. Control returns to block 802.

At block 812, the trailer sway control circuitry 104 continuously monitors the load at the wheels and in the trailer 102 while an operator is driving the vehicle 100. For example, the parameter estimation circuitry 208 may continue to estimate the load at ones of the vehicle wheels and ones of the trailer wheels while the vehicle 100 and the trailer 102 are in motion. In some examples, the parameter estimation circuitry 208 estimates the load while the motion of the vehicle 100 and the trailer 102 has temporarily ceased (e.g., while the vehicle 100 is at a stoplight).

At block 814, the trailer sway control circuitry 104 determines if a change in the load at one or more wheels changes is greater than a predetermined threshold. For example, the prediction circuitry 204 may compare a first load experienced at a first vehicle wheel (e.g., vehicle wheel 106A) at a first time with a second load experienced at the first vehicle wheel (e.g., vehicle wheel 106A) at a second time after the first time. In response to the change in the load experienced at the first vehicle wheel that is greater than the predetermined threshold (e.g., block 814 returns a result of YES), control flows to block 816. In response to the change in the load experienced at the first vehicle wheel not being greater than the predetermined threshold (e.g., block 814 returns a result of NO), control flows to block 818. The predetermined threshold may be based on the table 600 of FIG. 6 and/or manufacturer recommendations for the load at the vehicle wheels 106 and/or the trailer wheels 107.

At block 816, the example trailer sway control circuitry 104 activates at least one vehicle control. For example, the control activation circuitry 206 may activate a torque system to accelerate or decelerate at least one trailer wheel 107A, 107B (e.g., trailer brakes 117 or an electric motor 115). In some examples, the activated vehicle control includes pre-charging the braking system, warning the operator of the vehicle 100, instructing the operator of the vehicle 100 to navigate to a location to adjust or resecure a load in the trailer 102, limit a speed of the vehicle 100, biasing acceleration to at least one of the vehicle front wheels 106A, 106B, the rear vehicle wheels 106C, 106D, and the trailer wheels 107A, 107B. In some examples, activation of the vehicle controls avoids activation of one or more emergency control systems of the vehicle 100. In some examples, the emergency control systems include anti-lock brakes (e.g., ABS), traction control (e.g., TCS), Electronic stability control (e.g., ESC), rollover stability control (e.g., RSC™).

At block 818, the trailer sway control circuitry 104 is to determine whether to continue monitoring. For example, in response to the prediction circuitry 204 determining to continue monitoring the load at the vehicle wheels 106 and the trailer wheels 107 (e.g., block 818 returns a result of YES), control returns to block 802. Alternatively, in response to the prediction circuitry 204 determining not to continue monitoring the load at the vehicle wheels 106 and the trailer wheels 107 (e.g., block 818 returns a result of NO), control ends.

FIG. 9 is a flowchart representative of example machine readable instructions and/or example operations 900 that may be executed and/or instantiated by processor circuitry to implement the example trailer sway control circuitry 104 of FIG. 2 to prevent a trailer sway by applying torque to at least one wheel of the vehicle 100 and/or the trailer 102. At block 902, the sensor interface circuitry 202 obtains sensor data. For example, the sensor interface circuitry 202 may obtain sensor data from the example sensor database 214 as described in connection with block 702 of FIG. 7 and/or block 802 of FIG. 8 above.

At block 904, the trailer sway control circuitry 104 monitors a load distribution of the vehicle 100. For example, the prediction circuitry 204 monitors the load distribution of the vehicle 100 based on an estimated load at ones of the vehicle wheels 106 and/or the trailer wheels 107, upcoming path changes (e.g., represented by the vehicle path data 312, road changes, slope changes), and tongue measurements.

At block 906, the trailer sway control circuitry 104 predicts whether a trailer sway condition is likely to occur. For example, the prediction circuitry 204 may predict, based on sensor data from one or more sensors of the vehicle 100 and/or the trailer 102, whether a trailer sway condition is likely to occur. In some examples, the likelihood of a trailer sway condition occurring is determined based on the table 600 of FIG. 6.

At block 908, the trailer sway control circuitry 104 determines if a trailer sway is likely to occur. The prediction circuitry 204 determines that, in response to a likelihood of a trailer sway condition being at or above a predetermined threshold, the trailer sway condition is likely to occur. The prediction circuitry 204 is to instruct the control activation circuitry 206 to activate at least one vehicle control. For example, in determining that a trailer sway condition is not likely to occur (e.g., block 908 returns a result of NO), control flows to block 914. For example, in determining that a trailer sway condition is likely to occur (e.g., block 908 returns a result of YES), control flows to block 910.

At block 910, the trailer sway control circuitry 104 activates at least one vehicle control of the vehicle 100 to prevent the predicted trailer sway condition from occurring. For example, the control activation circuitry 206 may activate a warning system, bias torque to rear vehicle wheels 106C, 106D, and/or reduce a vehicle speed. In some examples, the control activation circuitry 206 instructs the communication interface circuitry 210 to present a message (e.g., a warning) to the operator of the vehicle 100. The message may instruct the operator to safely slow the vehicle 100 and the trailer 102 to a stop. In some examples, the warning message may instruct the operator to rearrange a load in the trailer 102. In some examples, the control activation circuitry 206 may bias torque to the rear vehicle wheels 106C, 106D. The increased torque in the rear vehicle wheels 106C, 106D (and decreased torque in the front vehicle wheels 106A, 106B, where the torque is adjusted in proportion to the estimated load on each of the vehicle wheels 106) improves grip of the vehicle wheels 106. In some examples, the control activation circuitry 206 may bias torque between the front vehicle wheels 106A, 106B and the rear vehicle wheels 106C, 106D. In some examples, the control activation circuitry 206 may bias torque between the first vehicle side wheels 106A, 106C, and the second vehicle side wheels 106B, 106D. The control activation circuitry 206 may bias the torque between the front and rear of the vehicle 100 and the first and second side of the vehicle 100 at the same time.

At block 912, the trailer sway control circuitry 104 applies torque to at least one wheel of the vehicle 100 and/or a trailer 102 coupled to the vehicle 100. For example, the control activation circuitry 206 instructs a regenerative braking system to apply a decelerating torque to at least one of the trailer wheels 107A, 107B. For example, the control activation circuitry 206 may instruct trailer acceleration system 120 (e.g., an electric motor 115A) coupled to at least one trailer wheel 107A, 107B to apply an accelerating torque to the at least one trailer wheel 107A, 107B. In some examples, the control activation circuitry 206 may instruct vehicle acceleration system 113 (e.g., an electric motor 114A) coupled to at least one vehicle wheel 106A, 106B to apply an accelerating torque to the at least one vehicle wheel 106A, 106B. In some examples, the control activation circuitry 206 may instruct the vehicle acceleration system 113 and/or the trailer acceleration system 120 to apply increase or decrease a torque currently demanded by the operator of the vehicle 100.

At block 914, the trailer sway control circuitry 104 determines whether to continue monitoring. For example, in response to the prediction circuitry 204 determining to continue monitoring (e.g., block 914 returns a result of YES), control returns to block 902. Alternatively, in response to the control activation circuitry 206 determining to not continue monitoring (e.g., block 914 returns a result of NO), control ends.

Figure 10:
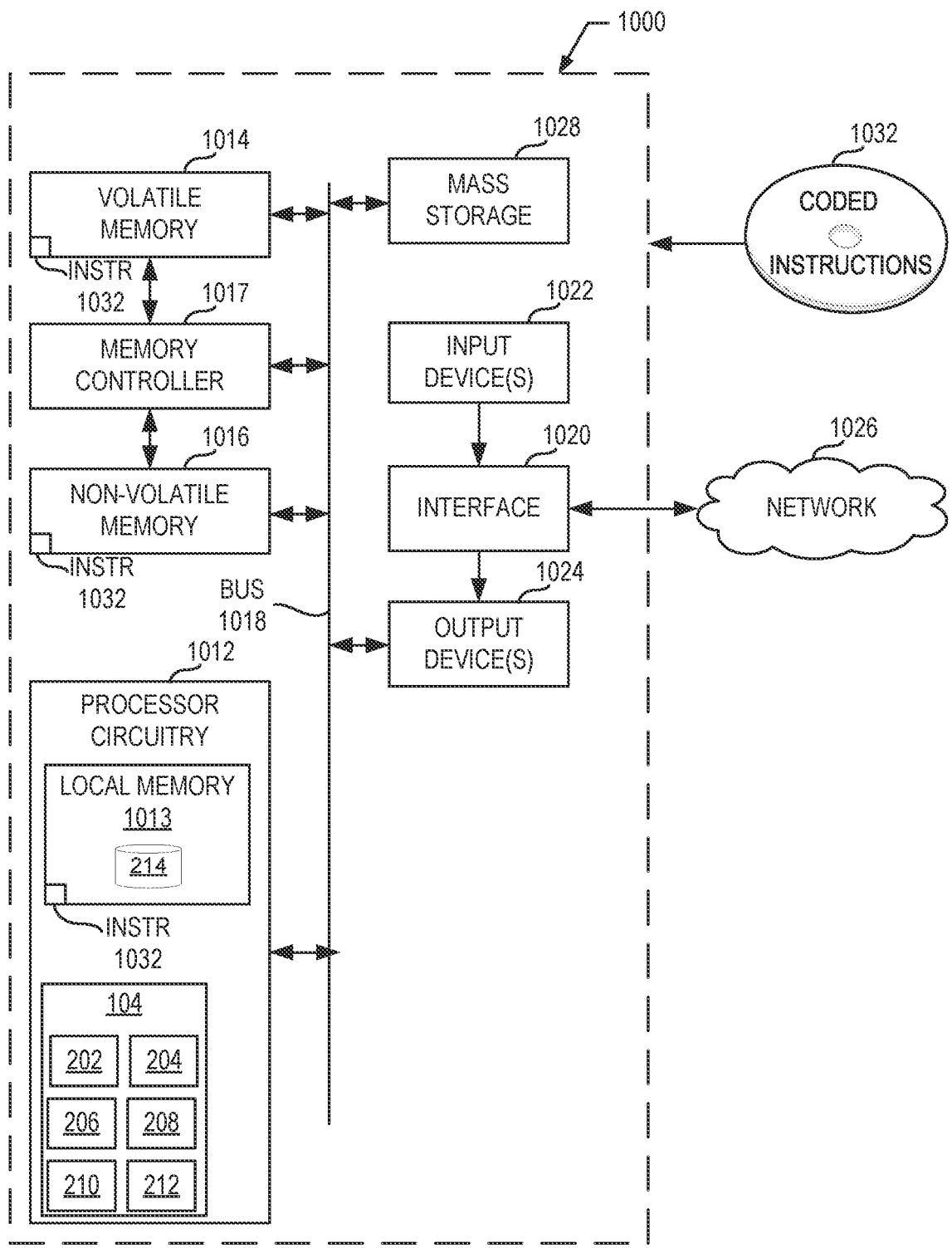
FIG. 10 is a block diagram of an example processing platform including processor circuitry structured to execute the example machine readable instructions of FIGS. 7-9 to implement the example trailer sway circuitry of FIG. 2.

FIG. 10 is a block diagram of an example processor platform 1000 structured to execute and/or instantiate the machine readable instructions and/or the operations of FIGS. 7-9 to implement the trailer sway control circuitry 104 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the sensor interface circuitry 202, the example prediction circuitry 204, the example control activation circuitry 206, the example parameter estimation circuitry 208, the example communication interface circuitry 210, the example path monitoring circuitry 212, and the example sensor database 214, and, more generally the example trailer sway control circuitry 104.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS®

Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD.

Figure 11:
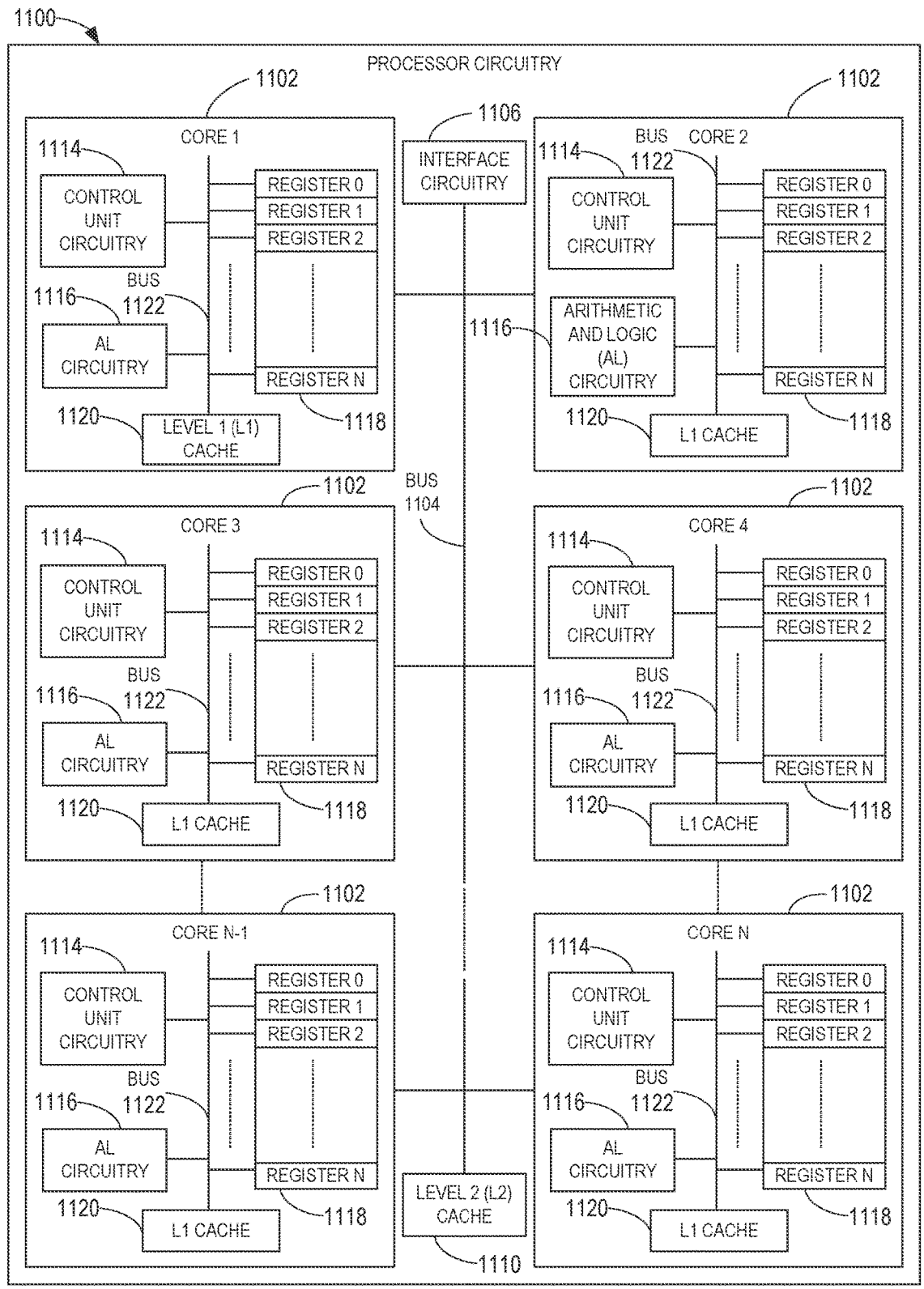
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 7-9 to effectively instantiate the circuitry of FIG. 2 [er diagram] as logic circuits to perform the operations corresponding to those machine readable instructions. In some such examples, the circuitry of FIG. 2 [er diagram] is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7-9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
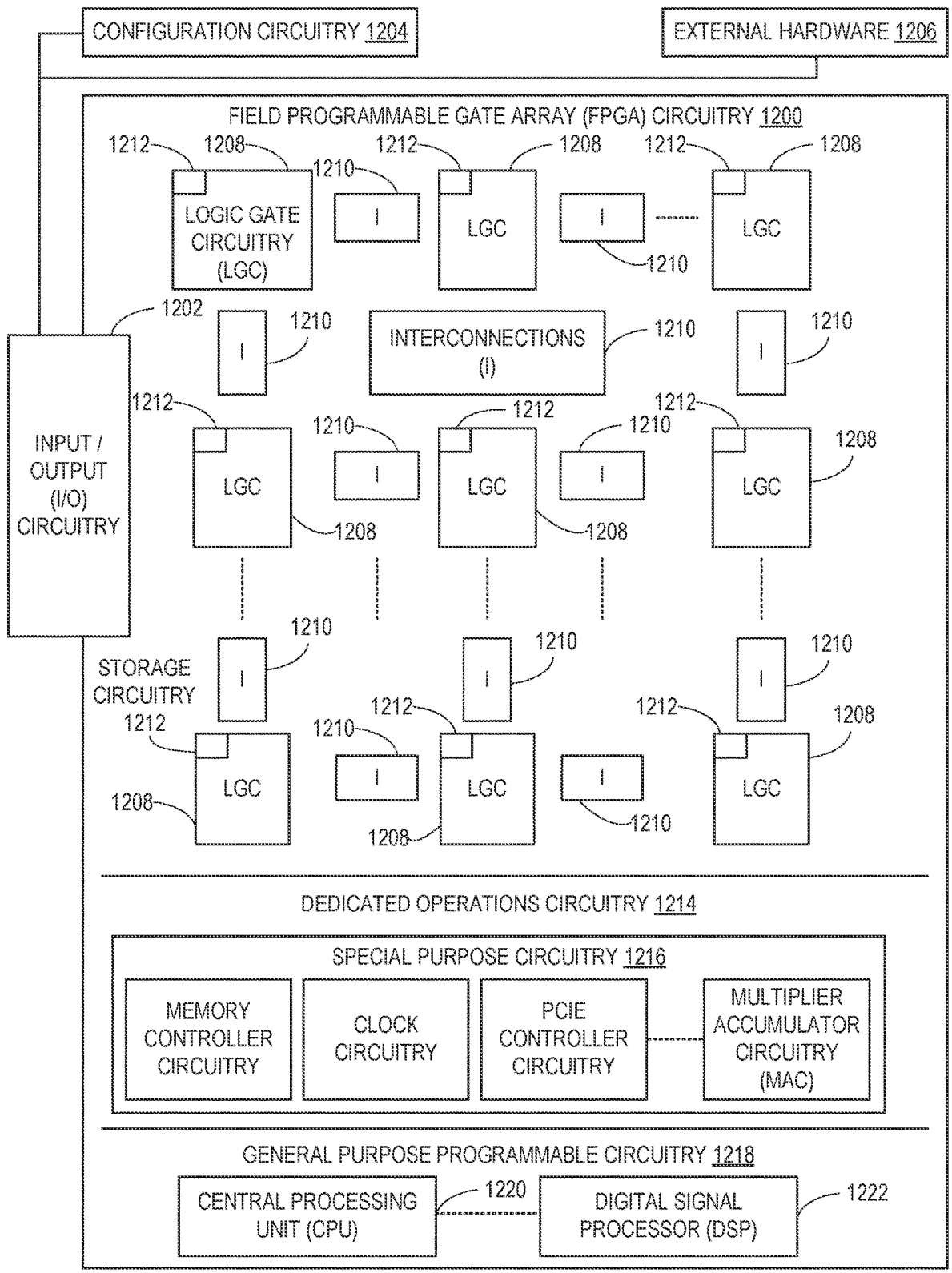
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 7-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7-9. As such, the FPGA circuitry 1200 may be structured to effectively instantiate some or all of the machine readable instructions of the flowcharts of FIGS. 7-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 7-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 6, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 7-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an onboard CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 7-9 may be executed by one or more of the cores 1102 of FIG. 11, a second portion of the machine readable instructions represented by the flowcharts of FIGS. 7-9 may be executed by the FPGA circuitry 1200 of FIG. 12, and/or a third portion of the machine readable instructions represented by the flowcharts of FIGS. 7-9 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that predict and prevent a trailer sway based on sensor data. Disclosed systems, methods, apparatus, and articles of manufacture improve the safety of a vehicle by activating a torque on a wheel of trailer coupled to the vehicle. Disclosed systems, methods, apparatus, and articles of manufacture improve the efficiency of a computing device by using various sensor data to predict when a trailer sway is likely to occur, which prevents or reduces activation of emergency vehicle controls which saves electricity. Disclosed systems, methods, apparatus, and articles of manufacture are accordingly directed to one or more improvement(s) in the operation of a machine such as a computer or other electronic and/or mechanical device.

Example 1 includes an apparatus to control trailer sway of a trailer coupled to a vehicle, the apparatus comprising prediction circuitry to predict, based on sensor data from one or more sensors of the vehicle, whether a trailer sway condition associated with the vehicle is likely to occur, and control activation circuitry to, in response to a prediction that the trailer sway condition is likely to occur, activate at least one vehicle control of the vehicle to prevent the trailer sway condition from occurring, the at least one vehicle control to include applying torque to at least one of one or more trailer wheels of the trailer or one or more vehicle wheels of the vehicle.

Example 2 includes the apparatus of example 1, wherein the sensor data includes load data, and further including parameter estimation circuitry to estimate, based on the load data, a load distribution on at least one of the one or more vehicle wheels or the one or more trailer wheels, and the prediction circuitry to predict the trailer sway condition based on the load distribution.

Example 3 includes the apparatus of example 2, wherein the parameter estimation circuitry is to determine the load distribution of the trailer in response to detection of a curve in a projected path of the vehicle.

Example 4 includes the apparatus of example 3, wherein the control activation circuitry is to adjust, based on historical data, a speed of the vehicle prior to the vehicle entering the curve, wherein to adjust the speed of the vehicle includes at least one of accelerating or decelerating the trailer.

Example 5 includes the apparatus of example 2, wherein the parameter estimation circuitry is to estimate frictional forces based on a detected road condition, and emergency control based friction estimates, the emergency control based friction estimates determined when at least one of the one or more vehicle wheels is in a non-linear response range.

Example 6 includes the apparatus of example 2, wherein the parameter estimation circuitry is to determine a tongue load on a vehicle tongue, the vehicle tongue to couple the vehicle to the trailer, wherein the control activation circuitry is to in response to the tongue load being less than or equal to a first tongue load threshold, adjust the at least one vehicle control based on a first setting, in response to the tongue load being between the first tongue load threshold and a second tongue load threshold, adjust the at least one vehicle control based on a second setting, and in response to the tongue load being greater than or equal to the second tongue load threshold, adjust the at least one vehicle control based on a third setting different from the first setting and the second setting.

Example 7 includes the apparatus of example 6, wherein in response to the parameter estimation circuitry determining that the tongue load is less than the first tongue load threshold, the control activation circuitry is to (i) increase a sensitivity setting of a trailer sway control system, and (ii) increase a deceleration torque setting to at least one of the one or more trailer wheels.

Example 8 includes the apparatus of example 6, wherein in response to the parameter estimation circuitry determining that the tongue load is greater than the second tongue load threshold, the control activation circuitry is to (i) decrease a sensitivity setting of a trailer sway control system, and (ii) increase a deceleration torque of a rear wheel of the one or more vehicle wheels.

Example 9 includes the apparatus of example 1, wherein the control activation circuitry is to determine a likelihood of the trailer sway condition based on vehicle weight, trailer weight, center of gravity, and tongue load data, and determine a torque output for at least one of the one or more vehicle wheels or the one or more trailer wheels.

Example 10 includes the apparatus of example 1, wherein the control activation circuitry applies a negative torque to at least one of the one or more trailer wheels of the trailer and applies a positive torque on at least one of the one or more vehicle wheels of the vehicle to prevent trailer sway.

Example 11 includes a method for controlling trailer sway of a trailer coupled to a vehicle, the method comprising predicting, based on sensor data from one or more sensors of the vehicle, whether a trailer sway condition associated with the vehicle is likely to occur, and in response to a prediction that the trailer sway condition is likely to occur, activating at least one vehicle control of the vehicle to prevent the trailer sway condition from occurring, the at least one vehicle control to include applying torque to at least one of one or more trailer wheels of the trailer or one or more vehicle wheels of the vehicle.

Example 12 includes the method of example 11, further including estimating, based on load data, a load distribution on at least one of the one or more vehicle wheels or the one or more trailer wheels, and predicting the trailer sway condition based on the load distribution.

Example 13 includes the method of example 12, further including adjusting, based on historical data, a speed of the vehicle prior to the vehicle entering a curve, wherein adjusting the speed of the vehicle includes at least one of accelerating or decelerating the trailer.

Example 14 includes the method of example 12, further including determining a tongue load on a vehicle tongue, the vehicle tongue to couple the vehicle to the trailer, in response to the tongue load being less than or equal to a first tongue load threshold, adjusting the at least one vehicle control based on a first setting, in response to the tongue load being between the first tongue load threshold and a second tongue load threshold, adjust the at least one vehicle control based on a second setting, and in response to the tongue load being greater than or equal to the second tongue load threshold, adjusting the at least one vehicle control based on a third setting different from the first setting and the second setting.

Example 15 includes the method of example 14, further including, in response to determining that the tongue load is less than the first tongue load threshold, (i) increasing a sensitivity setting of a trailer sway control system, and (ii) decelerating at least one of the one or more trailer wheels.

Example 16 includes the method of example 14, further including, in response to determining that the tongue load is greater than the second tongue load threshold, (i) decreasing a sensitivity setting of a trailer sway control system, and (ii) decelerating a rear wheel of the one or more vehicle wheels.

Example 17 includes an apparatus to control trailer sway of a trailer coupled to a vehicle, the apparatus comprising at least one memory, machine readable instructions, and processor circuitry to at least one of instantiate or execute the machine readable instructions to predict, based on sensor data from one or more sensors of the vehicle, whether a trailer sway condition associated with the vehicle is likely to occur, and in response to a prediction that the trailer sway condition is likely to occur, activate at least one vehicle control of the vehicle to prevent the trailer sway condition from occurring, the vehicle control of the vehicle to include applying torque to at least one of one or more trailer wheels of the trailer or one or more vehicle wheels of the vehicle.

Example 18 includes the apparatus of example 17, wherein the instructions are further to cause the processor circuitry to estimate, based on load data, a load distribution on at least one of the one or more vehicle wheels or the one or more trailer wheels, and predict the trailer sway condition based on the load distribution.

Example 19 includes the apparatus of example 18, wherein the instructions are further to cause the processor circuitry to determine the load distribution of the trailer in response to detection of a curve in a projected path of the vehicle.

Example 20 includes the apparatus of example 19, wherein the instructions are further to cause the processor circuitry to adjust, based on historical data, a speed of the vehicle prior to the vehicle entering the curve, wherein to adjust the speed of the vehicle includes at least one of accelerating or decelerating the trailer.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to control trailer sway of a trailer coupled to a vehicle, the apparatus comprising:
   prediction circuitry to predict, based on sensor data from one or more sensors of the vehicle, whether a trailer sway condition associated with the vehicle is likely to occur; and
   control activation circuitry to, in response to a prediction that the trailer sway condition is likely to occur, activate at least one vehicle control of the vehicle to prevent the trailer sway condition from occurring, the at least one vehicle control to include applying torque to at least one of one or more trailer wheels of the trailer or one or more vehicle wheels of the vehicle.

2. The apparatus of claim 1, wherein the sensor data includes load data, and further including:
   parameter estimation circuitry to estimate, based on the load data, a load distribution on at least one of the one or more vehicle wheels or the one or more trailer wheels; and
   the prediction circuitry to predict the trailer sway condition based on the load distribution.

3. The apparatus of claim 2, wherein the parameter estimation circuitry is to determine the load distribution of the trailer in response to detection of a curve in a projected path of the vehicle.

4. The apparatus of claim 3, wherein the control activation circuitry is to adjust, based on historical data, a speed of the vehicle prior to the vehicle entering the curve, wherein to adjust the speed of the vehicle includes at least one of accelerating or decelerating the trailer.

5. The apparatus of claim 2, wherein the parameter estimation circuitry is to estimate frictional forces based on:
   a detected road condition; and
   emergency control based friction estimates, the emergency control based friction estimates determined when at least one of the one or more vehicle wheels is in a non-linear response range.

6. The apparatus of claim 2, wherein the parameter estimation circuitry is to determine a tongue load on a vehicle tongue, the vehicle tongue to couple the vehicle to the trailer, wherein the control activation circuitry is to:
in response to the tongue load being less than or equal to a first tongue load threshold, adjust the at least one vehicle control based on a first setting;
in response to the tongue load being between the first tongue load threshold and a second tongue load threshold, adjust the at least one vehicle control based on a second setting; and
in response to the tongue load being greater than or equal to the second tongue load threshold, adjust the at least one vehicle control based on a third setting different from the first setting and the second setting.

7. The apparatus of claim 6, wherein in response to the parameter estimation circuitry determining that the tongue load is less than the first tongue load threshold, the control activation circuitry is to:
(i) increase a sensitivity setting of a trailer sway control system; and
(ii) increase a deceleration torque setting to at least one of the one or more trailer wheels.

8. The apparatus of claim 6, wherein in response to the parameter estimation circuitry determining that the tongue load is greater than the second tongue load threshold, the control activation circuitry is to:
(i) decrease a sensitivity setting of a trailer sway control system; and
(ii) increase a deceleration torque of a rear wheel of the one or more vehicle wheels.

9. The apparatus of claim 1, wherein the control activation circuitry is to:
determine a likelihood of the trailer sway condition based on vehicle weight, trailer weight, center of gravity, and tongue load data; and
determine a torque output for at least one of the one or more vehicle wheels or the one or more trailer wheels.

10. The apparatus of claim 1, wherein the control activation circuitry applies a negative torque to at least one of the one or more trailer wheels of the trailer and applies a positive torque on at least one of the one or more vehicle wheels of the vehicle to prevent trailer sway.

11. A method for controlling trailer sway of a trailer coupled to a vehicle, the method comprising:
predicting, based on sensor data from one or more sensors of the vehicle, whether a trailer sway condition associated with the vehicle is likely to occur; and
in response to a prediction that the trailer sway condition is likely to occur, activating at least one vehicle control of the vehicle to prevent the trailer sway condition from occurring, the at least one vehicle control to include applying torque to at least one of one or more trailer wheels of the trailer or one or more vehicle wheels of the vehicle.

12. The method of claim 11, further including:
estimating, based on load data, a load distribution on at least one of the one or more vehicle wheels or the one or more trailer wheels; and
predicting the trailer sway condition based on the load distribution.

13. The method of claim 12, further including adjusting, based on historical data, a speed of the vehicle prior to the vehicle entering a curve, wherein adjusting the speed of the vehicle includes at least one of accelerating or decelerating the trailer.

14. The method of claim 12, further including:
determining a tongue load on a vehicle tongue, the vehicle tongue to couple the vehicle to the trailer;
in response to the tongue load being less than or equal to a first tongue load threshold, adjusting the at least one vehicle control based on a first setting;
in response to the tongue load being between the first tongue load threshold and a second tongue load threshold, adjust the at least one vehicle control based on a second setting; and
in response to the tongue load being greater than or equal to the second tongue load threshold, adjusting the at least one vehicle control based on a third setting different from the first setting and the second setting.

15. The method of claim 14, further including, in response to determining that the tongue load is less than the first tongue load threshold:
(i) increasing a sensitivity setting of a trailer sway control system; and
(ii) decelerating at least one of the one or more trailer wheels.

16. The method of claim 14, further including, in response to determining that the tongue load is greater than the second tongue load threshold,
(i) decreasing a sensitivity setting of a trailer sway control system; and
(ii) decelerating a rear wheel of the one or more vehicle wheels.

17. An apparatus to control trailer sway of a trailer coupled to a vehicle, the apparatus comprising:
at least one memory;
machine readable instructions; and
processor circuitry to at least one of instantiate or execute the machine readable instructions to:
predict, based on sensor data from one or more sensors of the vehicle, whether a trailer sway condition associated with the vehicle is likely to occur; and
in response to a prediction that the trailer sway condition is likely to occur, activate at least one vehicle control of the vehicle to prevent the trailer sway condition from occurring, the vehicle control of the vehicle to include applying torque to at least one of one or more trailer wheels of the trailer or one or more vehicle wheels of the vehicle.

18. The apparatus of claim 17, wherein the instructions are further to cause the processor circuitry to:
estimate, based on load data, a load distribution on at least one of the one or more vehicle wheels or the one or more trailer wheels; and
predict the trailer sway condition based on the load distribution.

19. The apparatus of claim 18, wherein the instructions are further to cause the processor circuitry to determine the load distribution of the trailer in response to detection of a curve in a projected path of the vehicle.

20. The apparatus of claim 19, wherein the instructions are further to cause the processor circuitry to adjust, based on historical data, a speed of the vehicle prior to the vehicle entering the curve, wherein to adjust the speed of the vehicle includes at least one of accelerating or decelerating the trailer.

* * * * *